United States Patent
Mack

(10) Patent No.: US 12,396,828 B2
(45) Date of Patent: Aug. 26, 2025

(54) METHOD FOR PROVIDING A 3D-PRINT DATA SET OF A DENTAL MODEL STRUCTURE, COMPUTER PROGRAM PRODUCT, DENTAL MODEL STRUCTURE, MOUNTING PLATE AND DENTAL MODEL SYSTEM

(71) Applicant: SAM PRAZISIONSTECHNIK GMBH, Gauting (DE)

(72) Inventor: Florian Mack, Gauting (DE)

(73) Assignee: SAM PRAZISIONSTECHNIK GMBH (DE)

( * ) Notice: Subject to any disclaimer, the term of this patent is extended or adjusted under 35 U.S.C. 154(b) by 925 days.

(21) Appl. No.: 17/437,112

(22) PCT Filed: Mar. 5, 2020

(86) PCT No.: PCT/EP2020/055827
§ 371 (c)(1),
(2) Date: Sep. 8, 2021

(87) PCT Pub. No.: WO2020/182601
PCT Pub. Date: Sep. 17, 2020

(65) Prior Publication Data
US 2022/0168076 A1 Jun. 2, 2022

(30) Foreign Application Priority Data
Mar. 8, 2019 (EP) ..................... 19161552

(51) Int. Cl.
*A61C 11/08* (2006.01)
*A61C 9/00* (2006.01)
(Continued)

(52) U.S. Cl.
CPC .......... *A61C 11/085* (2013.01); *A61C 9/0053* (2013.01); *A61C 13/34* (2013.01);
(Continued)

(58) Field of Classification Search
CPC ..... A61C 11/085; A61C 11/08; A61C 9/0053; A61C 13/34; B29C 64/386; B33Y 50/00;
(Continued)

(56) References Cited

U.S. PATENT DOCUMENTS

| 8,043,091 B2 | 10/2011 | Schmitt |
| 2007/0190492 A1 | 8/2007 | Schmitt |

(Continued)

FOREIGN PATENT DOCUMENTS

| AT | 518736 | 12/2017 |
| DE | 4206835 | 9/1993 |

(Continued)

OTHER PUBLICATIONS

Fisker Rune Virtual Design of Attachment of Dental Model in Articulator Apr. 11, 2013 WIPO-3SHAPE A/S WO 2013050536 pp. 2-53, Figures 1-11.*

(Continued)

*Primary Examiner* — Prabodh M Dharia
(74) *Attorney, Agent, or Firm* — Onello & Mello, P.C.

(57) ABSTRACT

The invention relates to a method for providing a 3D-print data set of a dental model structure (100) to be mounted on an articulator (5), comprising: —providing an articulator data set of the articulator (5) on which the dental model structure (100) is to be mounted; —providing a dental situation data set which represents a dental situation of an upper jaw and/or a lower jaw, the dental situation data set including data to display the dental situation as a virtual representation of the dental situation on a display; —selecting at least one distance element (20) from a plurality of different predefined and/or prefabricated distance elements based on the articulator data set and the dental situation data set; —generating a connecting structure data set representing at least a virtual connecting structure (15) arranged (Continued)

between the virtual representation of the dental situation and a virtual representation of the at least one selected distance element; and —generating the 3D-print data set based on the dental situation data set and the connecting structure data set. Furthermore, the invention relates to a corresponding computer program product, a dental model structure, a mounting plate and a dental model system.

25 Claims, 13 Drawing Sheets

(51) Int. Cl.
    *A61C 13/34*     (2006.01)
    *B29C 64/386*     (2017.01)
    *B29L 31/40*     (2006.01)
    *B33Y 50/00*     (2015.01)
    *B33Y 80/00*     (2015.01)
    *G06F 30/17*     (2020.01)
    *G06F 113/10*     (2020.01)

(52) U.S. Cl.
    CPC ............ *B29C 64/386* (2017.08); *B33Y 50/00* (2014.12); *B33Y 80/00* (2014.12); *G06F 30/17* (2020.01); *B29L 2031/40* (2013.01); *G06F 2113/10* (2020.01); *G06T 2219/2016* (2013.01)

(58) Field of Classification Search
    CPC ..... B33Y 80/00; G06F 30/17; G06F 2113/10; B29L 2031/40; G06T 2219/2016

USPC .............................. 345/418; 378/204; 433/24
    See application file for complete search history.

(56) References Cited

U.S. PATENT DOCUMENTS

| | | | | |
|---|---|---|---|---|
| 2008/0261165 | A1* | 10/2008 | Steingart | B33Y 50/00 433/24 |
| 2012/0230567 | A1* | 9/2012 | Greenberg | B33Y 50/00 378/204 |
| 2014/0242539 | A1* | 8/2014 | Fisker | A61C 9/0046 700/98 |
| 2014/0315145 | A1* | 10/2014 | Boltanski | A61C 11/027 433/57 |
| 2019/0247170 | A1* | 8/2019 | Huffman | A61C 11/00 |
| 2020/0405455 | A1* | 12/2020 | Nikolskiy | A61B 6/466 |

FOREIGN PATENT DOCUMENTS

| | | |
|---|---|---|
| DE | 202017101588 | 3/2017 |
| WO | 2007084768 | 7/2007 |
| WO | 2013050536 | 4/2013 |

OTHER PUBLICATIONS

European Search Report dated Oct. 23, 2019 issued in corresponding European Application No. 19161552.5.
International Search Report dated Jun. 25, 2020 issued in corresponding International Application No. PCT/EP2020/055827.

* cited by examiner 17a   25,0   17a 17a   35,0   17a 17a   45,0   17a 17a   55,0   17a

METHOD FOR PROVIDING A 3D-PRINT DATA SET OF A DENTAL MODEL STRUCTURE, COMPUTER PROGRAM PRODUCT, DENTAL MODEL STRUCTURE, MOUNTING PLATE AND DENTAL MODEL SYSTEM

The present invention generally relates to dentistry. More particularly, the present invention relates to a method for providing a 3D-print data set of a dental model structure, to a corresponding computer program product and to a dental model structure.

An articulator is a mechanical device which provides a simplified geometrical model of the head (cranium and mandible) for simulating the relative movements of the human jaws for testing occlusion of teeth. An articulator is used by a dental technician when modelling dental restorations for a patient, and the dental technician may alternate between modelling the restorations and evaluating the function of the bite or occlusion using the articulator.

Conventionally, for modelling dental restorations, dental models of the patient are created by means of dental casts in order to model the patient's dental situation, for example the upper jaw situation, the lower jaw situation and the bite situation. These "analog" dental models can then be used by a dentist or dental technician in connection with an articulator in order to provide, e.g., a dental prosthesis. In the present description, the terms "real" or "analog" are used to describe things in the real world, i.e., things that can be handled or touched by a human, contrary to the term "virtual" or "digital", which are used to describe things in a virtual or digital world, i.e., things that are based on a data set and that can only be graphically displayed on a display, but not actually touched by a human.

In order to simulate the movements of upper jaw and lower jaw with respect to the teeth, also the position of the dental model with respect to the articulator has to be known. For this purpose, a so-called "facebow" may be used. A facebow is a mechanical device which is used to register the relationship of the patient's maxillary arch in three planes of space and transfer this information into the articulator that can be adjusted to simulate the patient's jaw movements. In particular, by means of a facebow, it is possible to determine geometric data of the patient's head. Such a facebow is described, e.g., in WO 2016 034 672 A1.

Nowadays, digitization becomes more and more important, also in the field of dentistry. For example, a so-called "intraoral scanner" can be used in order to capture digital data of the teeth (e.g. stereoscopic 3D-images), which can then be further used in combination with a "virtual articulator", i.e., an articulator that is simulated by a software or computer program. Based on the scanned digital data, a virtual representation of the teeth or the dental situation can be displayed on a display together with the virtual articulator. In this way, the dental situation as well as relative movements of the upper jaw with respect to the lower jaw can be simulated and, e.g., a dental prosthesis can be designed by using a computer.

However, despite this trend of digitization, it is still important for a dentist and/or a dental technician to handle with an "analog model" and a real articulator. This is because, on the one hand, the dentists have been taught in their studies how to use such analog models in connection with a real articulator. And on the other hand, there are advantages which a mere digital model in combination with a virtual articulator cannot offer, such as a real three-dimensional perception and/or the possibility of touching the models. Also, dentists have responsibilities with respect to their patients and therefore prefer a "tangible" model which can be presented to the patient.

Thus, it is desired to have both a real or analog model that can be used in connection with a real articulator, and corresponding digital data for a digital model that can be used in connection with a virtual articulator (software). Such an intersection between analog and digital dentistry may be achieved by first fabricating an analog model (e.g. a dental cast) and then scanning this analog model by means of a desktop scanner in order to generate corresponding digital data. However, this approach is time consuming and error-prone. Moreover, 3D-printing of a conventional dental model structure that is intended to be mounted between the base plates or mounting plates of an articulator is not practicable with available 3D-printers, because a 3D-print of such large conventional model structures (the height has to fit the height between the base plates of the articulator) is very expensive and time consuming. Further, due to the large dimensions or heights of these conventional model structures, a 3D-print may even be not possible with at least most of the commercially available 3D-printers. Moreover, when printing smaller dental model structures, it is necessary to plaster these dental model structures into the articulator using gypsum or dental stone, thereby enlarging the dimensions of the dental model structures to a height that is substantially equal to the distance between the mounting plates of the articulator. Due to the large size of such conventional dental model structures, its storage is challenging and expensive.

Thus, it is an object of the present invention to provide a dental model structure that is easy to fabricate, particularly by means of a full digital workflow, and that can directly be used in connection with an articulator. Further, it is an object of the present invention to provide a method which enables the fabrication of such a dental model structure. These objects are solved by the subject-matters of the independent claims. Preferred embodiments are defined by the dependent claims.

According to one aspect of the present invention, a method for providing a 3D-print data set of a dental model structure to be mounted on an articulator is provided. The method comprising:
providing an articulator data set of the articulator on which the dental model structure is to be mounted;
providing a dental situation data set which represents a dental situation of an upper jaw and/or a lower jaw, the dental situation data set including data to display the dental situation as a virtual representation of the dental situation on a display;
selecting at least one distance element from a plurality of different predefined and/or prefabricated distance elements based on the articulator data set and the dental situation data set;
generating a connecting structure data set representing at least a virtual connecting structure arranged between the virtual representation of the dental situation and a virtual representation of the at least one selected distance element; and
generating the 3D-print data set based on the dental situation data set and the connecting structure data set.

The term "virtual" as used in the present description generally means that an element that is named as a "virtual" element is a digital and/or graphical representation of a corresponding "real" or "actual" element. Thus, the term "virtual" indicates that the corresponding element is not a real element but only simulated by a software, i.e., by a computer or processor.

The "dental model structure" is a three dimensional (3D) structure including a dental model or a dental situation element, the dental model being also referred to as a tooth model, a scan model or a 3D-model.

The step of providing an articulator data set may comprise selecting, e.g. by a user interaction or a user input, a specific articulator that is or should be used in connection with the dental model structure. In particular, based on the user selection, the software provides a corresponding articulator data set. The articulator may be selected from a predefined set of articulators provided by the software. The "articulator data set" is a data set comprising data of a specific articulator. In particular, the articulator data set comprises the distance between an upper and lower articulator base plate. Preferably, the articulator data set comprises all data necessary to graphically display the articulator as a virtual articulator on a display, e.g. coordinates of the articulator in a predefined coordinate system.

The step of providing a dental situation data set may include a user interaction or a user input. In particular, the user may select and open a dental situation data set that is stored in a memory or on a database. The "dental situation data set", which is also referred to as "dental model data set", "teeth scan" or just "3D-scan", represents a dental situation, particularly a tooth situation, of a patient and includes data which are suitable to display the dental situation as a virtual representation of the dental situation on a display. The "dental situation", which may also be referred to as a "tooth situation", a "dental model" or a "tooth model" may comprise an upper jaw situation and/or a lower jaw situation. It may also comprise a bite situation. Accordingly, the "dental situation data set" may comprise data or information with respect to the teeth, particularly with respect to the upper jaw and/or the lower jaw, of a patient. In particular, the dental situation data set may comprise an upper jaw data set and/or a lower jaw data set. The dental situation data set, i.e. the upper jaw data set and/or the lower jaw data set, may be measured by means of an intraoral scanner or obtained by a laboratory desktop scanner. Alternatively or in addition, the dental situation data set may be measured by means of cone beam computer tomography (CBCT), i.e., the dental situation data set may be obtained by a CBCT scan. The dental situation data set may further comprise a bite relation data set which may be measured by using well-known bite relation measurement means. Alternatively or in addition, the dental situation data set may comprise an upper jaw position data set which may be measured by using well-known upper jaw position measurement means such as "ATB" (analog), "AxioPRISA" (digital) and/or an intraoral scanner. Alternatively or in addition, the dental situation data set may comprise a lower jaw movement data set which may be measured by using well-known measurement means for recording the movement of the lower jaw.

At least one distance element is selected from a plurality of different predefined and/or prefabricated distance elements based on the articulator data set and the dental situation data set. In other words, the selection of the at least one distance element depends on the articulator which is intended to be used with the dental model structure and further depends on the dental model, particularly on the 3D-scan of the teeth. In particular, the at least one distance element is selected based on the distance between an upper and lower base plate of the articulator, and further based on the height of the virtual representation of the dental situation, i.e., based on the dental model or 3D-scan height.

Preferably, a pair of distance elements, namely an upper jaw distance element and a lower jaw distance element, is selected. An upper jaw dental situation element and the associated upper connecting structure can then be connected with the upper base plate of the articulator via the upper jaw distance element. Correspondingly, a lower jaw dental situation element and the associated lower connecting structure can be connected with the lower base plate of the articulator via the lower jaw distance element. In the virtual or digital world, this may automatically be done by a software based on the corresponding virtual elements, i.e., base on the corresponding data sets. In the real or analog world, the distance elements are already prefabricated as standard distance elements (each having a predefined standard height). The prefabricated distance elements are intended to be reused many times. Therefore, it is only necessary to print the dental model structure without the distance elements. Rather, for prefabricating the distance elements, a 3D-printer is not necessary. The distance elements are preferably prefabricated by any fabrication method, which is faster and cheaper than a 3D-print. Each distance element may comprise a "distance block" (also referred to herein as "distance socket" or "mounting socket") and optionally a "mounting plate". The distance blocks may be made, at least partially, from aluminum, resin and/or stone. The mounting plates may be made, at least partially, from plastic material, preferably from polyamide, acrylonitrile-butadiene-styrene copolymers (ABS), polycarbonate (PC) and/or biocompatible plastics. Of course, the mounting plates may also be made, at least partially, from metal such as aluminum or any other metal alloy. The plurality of different predefined and/or prefabricated distance elements differ in their height. In other words, the plurality of different predefined and/or prefabricated distance elements comprises a predefined set of distance elements and/or distance blocks, wherein each distance element (particularly distance block) of the set has a distinct predefined height. For example, a set of distance elements or a set of distance blocks may comprise a certain number (e.g. two, three, four, five, six, seven, etc.) of upper jaw distance elements (particularly upper jaw distance blocks), each having a certain height that differs from the height of the other upper jaw distance elements (particularly upper jaw distance blocks), and a certain number (e.g. two, three, four, five, six, seven, etc.) of lower jaw distance elements (particularly lower jaw distance blocks), each having a certain height that differs from the height of the other lower jaw distance elements (particularly lower jaw distance blocks) of the set.

Preferably, the at least one distance element is selected such that the dental model structure, particularly a height of the dental model structure, is as small as possible. In other words, the at least one distance element is selected such that it has the maximal height from a plurality of available predefined heights of the different predefined and/or prefabricated distance elements, which makes it possible to arrange the virtual representation of the dental situation together with the at least one selected distance element between the upper and lower base plates of the articulator. The selection of the at least one distance element may be done automatically. Alternatively or additionally, the selection may be done by a user interaction, i.e., by receiving a user input for selecting the at least one distance element.

For example, an upper jaw distance element and a lower jaw distance element are selected such that the sum of heights of the upper jaw distance element, the lower jaw distance element and the virtual representation of the dental situation (i.e. the scan height) is as large as possible but less than the distance between the upper and the lower base plate of the articulator. In particular, an upper jaw distance element and a lower jaw distance element may be selected such that, in a mounting position, the inner space between the upper jaw distance element and the lower jaw distance element, particularly at a "split cast" surface, offers enough space to create a virtual mounting with a mounting plate inner surface and the cut boarderline of the digital teeth model.

The expression "generating" as used within the present description may encompass "determining" and/or "calculating", e.g. by a computer or processor. Accordingly, the connecting structure data set as well as the 3D-print data set may be determined and/or calculated by a computer and/or processor.

The "virtual connecting structure", also referred to as a "virtual connecting geometry", is a virtual structure or geometry that connects the virtual representation of the dental situation with a virtual representation of the at least one selected distance element. In particular, an upper connecting structure is arranged between the virtual representation of the dental situation and a virtual representation of an upper jaw distance element, and a lower connecting structure is arranged between the virtual representation of the dental situation and a virtual representation of a lower jaw distance element.

The "3D-print data set" of the dental model structure is a data set that comprises all data and/or information (e.g. coordinates, printing material information, etc.) necessary to print the dental model structure by means of a 3D-printer. Accordingly, the structure or content of the 3D-print data set may depend on the 3D-printer that is used for printing the dental model structure.

Between the steps of providing a dental situation data set and generating a connecting structure data set, the method may further comprise a step of positioning or aligning the virtual representation of the dental situation with respect to the virtual articulator. The optional positioning may be carried out automatically by using predefined standard or average values. In particular, the positioning may be carried out based on positioning data that can be obtained by corresponding measurements. In particular, a facebow may be used to determine the positioning data. For example, a corresponding measurement may be used to determine the positioning data. The positioning data may already be included in the dental situation data set or provided as a separate positioning data set that can be opened and used by the computer program.

Some or all of the method steps may be carried out by a computer program or software. The software may include user interactions so that a user can control different actions by user inputs, and/or the user can correct or fine-tune actions or calculations that are automatically carried out by the software.

The method according to the present invention provides an improved intersection between digital and analog dentistry. In particular, by selecting at least one distance element from a plurality of different predefined and/or prefabricated distance elements (a predefined set of distance elements, wherein the distance elements having different heights) based on the articulator data set and the dental situation data set, it is possible to reduce the dimension, particularly the height, of the dental model structure to a minimum. This is because the at least one selected distance element is used to mount the dental model structure on the articulator and it is not necessary that the height of the dental model structure equals the distance between the base plates of the articulator. Since the at least one selected distance element is or can be prefabricated, only the small dental model structure has to be printed, but not the at least one distance element. Thus, due to the smaller size of the dental model structure compared to conventional dental model structures that are used in connection with an articulator, 3D-printing can be carried out much faster and more cheaply. Even more, at least in view of the 3D-printers that are currently commercially available, 3D-printing of dental model structures that are intended to be directly used with an articulator (i.e. without the need of using additional mounting material such as gypsum or dental stone) becomes only possible with the method according to the present invention.

Furthermore, the dentist or dental technician usually has the obligation to store the dental models at least for a required predefined time. Since the prefabricated distance elements which, according to the present invention, are employed to mount the dental model structure on the articulator, can be used again in combination with other dental model structures, only the small printed dental model structures have to be stored by the dentist or dental technician. Thus, due to the small size of the dental model structures according to the present invention compared to conventional model structures (having a height that is substantially equal to the distance between the mounting plates of the articulator), the storage of dental models requires significantly less space and is therefore much easier and cheaper for the dentist or dental technician. The dentist or dental technician merely needs the at least one selected and prefabricated distance element in order to mount the small printed dental model structure according to the present invention on the articulator. For example, if the dentist or dental technician possesses a set of prefabricated distance elements with different heights, he can easily and directly mount any printed small dental model structures according to the present invention. Thus, according to the present invention, there is no longer any need to plaster the dental structures into the articulator using gypsum or dental stone, thereby saving time and effort as well as making storage easier.

In contrast to the present invention, a conventional plastering enlarges the dimensions of the dental model structures to a height that is equal to the distance between the mounting plates of the articulator and thus makes the storage of these conventional dental model structures difficult and expensive.

In a preferred embodiment, the method comprises:
providing an articulator data set of the articulator on which the dental model structure is to be mounted;
providing a dental situation data set which represents a dental situation of an upper jaw and a dental situation of a lower jaw, the dental situation data set including data to display the dental situations as a virtual representation of the dental situations on a display;
selecting an upper jaw distance element and a lower jaw distance element from a plurality of different predefined and/or prefabricated distance elements based on the articulator data set and the dental situation data set;
generating a connecting structure data set representing:
a virtual upper jaw connecting structure arranged between the virtual representation of the upper jaw situation and a virtual representation of the upper jaw distance element, and a virtual lower jaw connecting structure arranged between the virtual representation of the lower jaw situation and a virtual representation of the lower jaw distance element; and generating the 3D-print data set based on the dental situation data set and the connecting structure data set.

In a further preferred embodiment, the step of providing the dental situation data set comprises measuring the dental situation, for example by means of an intraoral scanner or by any other means (digital source) that is suitable to measure a dental situation. In other words, the step of providing the dental situation data may comprise the step of performing a teeth scan or a 3D-scan. It is to be understood that also any other available measurement technique can be carried out which is suitable to provide a digital dental situation data set.

In a further preferred embodiment, the step of generating the connecting structure data set comprises:

trimming the virtual representation of the dental situation to an essential part, wherein the essential part is preferably defined by a bite area plane and at least one cutting plane of the virtual representation of the dental situation, wherein the at least one cutting plane is parallel to the bite area plane and shifted with respect to the bite area plane by a predefined distance.

Trimming the virtual representation of the dental situation (i.e. the teeth scan or the 3D-scan) to an essential part particularly means that the height of the virtual representation or the scan is reduced in order to omit or cut away parts of the scan or scan data that are not necessary or even disturbing. The "essential part" is a part that includes at least the teeth and/or all information necessary for modelling the dental situation. Preferably, the trimming or cutting is performed such that the height of the virtual representation of the dental situation is reduced to a minimum height. The "bite area plane" is also referred to as "occlusal plane", which defines an imaginary surface that is related anatomically to the cranium and that theoretically touches the incisal edges of the incisors and the tips of the occluding surfaces of the posterior teeth. The "predefined distance", i.e. the offset of the at least one cutting plane, may be a standard or average value and/or may be based on a user input or user interaction. For example, the user may define this distance by a user interaction. Alternatively, the computer program may propose a distance value, e.g. a standard distance value, and the user may have the possibility to accept this value or fine-tune the proposed value with respect to the present situation. In particular, the distance, particularly the minimal distance, of the at least one cutting plane to the bite area plane corresponds to a maximal height of the teeth, thereby ensuring that all teeth are included in the dental model.

Preferably, the essential part is defined by an upper cutting plane and a lower cutting plane, wherein the upper cutting plane is parallel to the bite area plane and shifted by a predefined distance with respect to the bite area plane in an upper jaw direction, and wherein the lower cutting plane is parallel to the bite area plane and shifted by a predefined distance with respect to the bite area plane in a lower jaw direction being opposite to the upper jaw direction. In particular, the essential part is defined by the area between the upper cutting plane and the lower cutting plane.

In a further preferred embodiment, the bite area plane and/or the at least one cutting plane is/are defined by a user input or user interaction. For example, the user may define (e.g. by clicking) four specified points on the virtual representation of the dental situation data set in order to define the bite area plane. The specified points may be well-known points of the upper or lower jaw that are suitable to define the bite area plane. Alternatively or additionally, the bite area plane and/or the at least one cutting plane may be defined by solving a non-linear least squares optimization problem. This approach may be based on an initial estimation or an initial guess of the bite area plane, e.g. by using standard or average values. More particularly, the initial estimation may be based on a general or standard or average orientation of teeth or denture in space.

In a further preferred embodiment, the step of trimming the virtual representation of the dental situation to an essential part comprises creating at least one mesh boundary line that substantially lies on the at least one cutting plane, and wherein preferably a smoothing of the mesh boundary line is performed before the step of generating the connecting structure data set. In other words, a smoothing of the dental situation data set or its virtual representation, i.e. a smoothing of the teeth scan, may be carried out.

A "mesh boundary line" is a line that restricts or delimits the "meshes" of the dental situation data set or the corresponding virtual representation. In computer graphics, a "mesh" (as obtained, e.g., by a scanner) comprises closed traverses (polygons) for describing surfaces. More specifically, a "mesh" or "polygon mesh" is a collection of vertices, edges and faces that defines the shape of a polyhedral object in 3D computer graphics and solid modeling. The faces usually consist of triangles (triangle mesh), quadrilaterals, or other simple convex polygons, since this simplifies rendering, but may also be composed of more general concave polygons, or polygons with holes. Accordingly, a "mesh" in the sense of the present disclosure comprises virtual triangles, virtual quadrilaterals, or other virtual polygons, that is/are created when digitally measuring the dental situation, e.g. by using a scanner (particularly an intraoral scanner). Thus, the dental situation data set comprises such a mesh and/or corresponding mesh data. Based on the mesh (meshes) or mesh data comprised in the dental situation data set, the virtual representation of the dental situation on a display is possible.

In a further preferred embodiment, the connecting structure data set represents a virtual upper connecting structure for connecting an upper cutting plane of the representation of the dental situation with a virtual representation of an upper jaw distance element, and a virtual lower connecting structure for connecting a lower cutting plane of the virtual representation of the dental situation with a virtual representation of a lower jaw distance element. In other words, the connecting structure data set comprises data to represent a virtual upper connecting structure. In particular, the virtual upper connecting structure may connect a, preferably cleaned and/or smoothed, upper mesh boundary line that substantially lies on the upper cutting plane. Correspondingly, the virtual lower connecting structure may connect a, preferably cleaned and/or smoothed, lower mesh boundary line that substantially lies on the lower cutting plane. Accordingly, the step of trimming the virtual representation of the dental situation to an essential part comprises creating the before mentioned upper mesh boundary line and the before mentioned lower mesh boundary line.

In a further preferred embodiment, the at least one virtual connecting structure comprises a platform and a printing base plate, wherein a plurality of connecting meshes are created to be arranged between the platform and the printing base plate to connect a lower mesh boundary line of the platform with an upper mesh boundary line of the printing base plate. The printing base plate may be pre-modelled or predefined, i.e., the printing base plate may be a standard base plate which is configured to be connected with a mounting plate of the selected distance element. As already explained above, the "meshes" comprise or are virtual triangles that are digitally created by the software. In particular, in case the connecting structure data set represents a virtual upper jaw connecting structure and a virtual lower jaw connecting structure, the virtual upper jaw connecting structure comprises an associated upper jaw platform and an associated upper jaw printing base plate, and the virtual lower jaw connecting structure comprises an associated lower jaw platform and an associated lower jaw printing base plate.

Preferably, the printing base plate or each of the printing base plates includes specific information, for example a code or a name that is engraved on a visible side of the printing base plate. The specific information may comprise, for example, an order number and/or a patient number and/or corresponding names. Alternatively or additionally, the specific information may comprise information about the selected distance element associated with the corresponding virtual representation of the dental situation. Alternatively or additionally, the specific information may comprise information about the selected articulator. The specific information advantageously helps the dentist or dental technician with one or more of the following: identifying the dental model structure, associating the dental model structure with the client or patient, associating the dental model structure with a distance element, and associating the dental model structure with an articulator.

In a further preferred embodiment, the at least one virtual connecting structure is arranged such that an upper mesh boundary line of the platform coincides with the mesh boundary line of the representation of the dental situation. In particular, the at least one virtual connecting structure is arranged such that an upper mesh boundary line of the platform coincides with the, preferably cleaned and/or smoothed mesh boundary line of the representation of the dental situation.

In a further preferred embodiment, the printing base plate comprises mounting and/or fixing means for mounting and/or fixing the printing base plate on a prefabricated mounting plate of the at least one selected distance element. Preferably, the mounting and/or fixing means may comprise means that firmly fix the printing base plate and thus the dental model structure to the mounting plate of the at least one selected distance element, e.g. snapping means for a snapping mechanism.

In a further preferred embodiment, the step of generating the 3D-print data set comprises fusing the representation of the dental situation and the at least one virtual connecting structure. In particular, the step of generating the 3D-print data set comprises fusing the essential part of the representation of the dental situation and the at least one connecting structure. The term "fusing" encompasses "combining", and in particular calculating a combined data set.

In a further preferred embodiment, the method further comprises printing the dental model by means of a 3D-printer based on the 3D-print data set. Accordingly, in this preferred embodiment, the method relates to a method of fabricating a 3D dental model structure.

The method particularly relates to a computer implemented method. Accordingly, a computer with a processor, a memory and a display may be provided in order to carry out the method according to the invention. More particularly, a computer or a computer system may be provided that includes a processor that may implement or execute machine readable instructions performing some or all of the methods, functions and other processes described herein. Commands and data from the processor are communicated over a communication bus. The computer or the computer system may also include a main memory, such as a random access memory (RAM), where the machine readable instructions and data for the processor may reside during runtime, and a secondary data storage, which may be non-volatile and stores machine readable instructions and data. The memory and data storage are examples of computer readable mediums.

According to a further aspect of the present invention, a computer program product is provided, the computer program product comprising computer-readable instructions, which, when loaded into a memory of a computer and executed by the computer, cause the computer to perform a method according to the invention. In particular, the computer program product may relate to a program that is stored on a computer readable medium. Alternatively, the computer program product may relate to the computer readable medium that stores the program or a corresponding program code including the computer-readable instructions.

In particular, a dental model fixation system is provided, comprising:
 the computer program product according to the invention; and
 the plurality of prefabricated distance elements.

In particular, the plurality of prefabricated distance elements comprises a set of prefabricated distance blocks, wherein the distance blocks of the set differ in their height. For example, the set may comprise two, three, four, five, etc., distance blocks with different heights.

According to a further aspect of the present invention, a dental model structure is provided. The dental model structure comprises:
 at least one dental situation element representing a dental situation of an upper jaw and/or a lower jaw; and
 at least one connecting structure supporting the dental situation element;
 wherein the dental model structure, and particularly the at least one dental situation element and/or the at least one connecting structure, is/are designed and configured to be mounted on an articulator by means of at least one preselected and prefabricated distance element without the need of using further fixation material, and wherein the at least one dental situation element and the at least one connecting structure being fabricated by means of a 3D-printer.

The "dental situation element", also referred to as "tooth situation element", relates to the dental situation data set and the corresponding virtual representation of the dental situation, as described above in connection with the method of the present invention. The "at least one connecting structure" relates to the connecting structure data set and the corresponding virtual connecting structure, as described above in connection with the method of the present invention.

The at least one connecting structure may be integrally or unitarily formed with the dental situation element. In other words, the dental situation element and the connecting structure may be integrally or unitarily formed.

In particular, the dental model structure (particularly the at least one connecting structure) comprises mounting means to be connected with at least one preselected and prefabricated distance element and to be mounted on an articulator by means of the at least one preselected and prefabricated distance element. Further, a height of the dental model structure is preferably such that the mounting on the articulator by means of the at least one preselected and prefabricated distance element can be carried out without the need of using further fixation material.

A "further fixation material" may include, e.g., dental gypsum, dental stone or any other material conventionally used in dentistry for fixing a dental model structure on an articulator. The further fixation material may thus relate to any fixing means other than the at least one predefined and prefabricated distance element.

The feature according to which the at least one dental situation element and the at least one connecting structure being fabricated by means of a 3D-printer implicitly includes structural features. For example, contrary to a dental model structure being fabricated by other fabrication methods, the 3D-printed dental model structure is formed on a layer by layer basis and thus has a layered configuration or structure. Moreover, 3D-printing the dental situation element implicitly means that the at least one dental situation element and the at least one connecting structure are unitarily formed. Preferably, the 3D-printed dental situation element is made from a synthetic material and/or plastics (e.g. photo-polymers).

It is to be understood that any features relating to virtual elements or components that have been mentioned and described above with respect to the method according to the invention, also apply, mutatis mutandis, to the actual elements and components that are printed. In particular, all features relating to the virtual representation of the dental situation also apply, mutatis mutandis, to the dental situation element, and all features relating to the at least one virtual connecting structure also apply, mutatis mutandis, to the actual connecting structure. For example, the at least one dental situation element may comprise an upper jaw situation element and a lower jaw situation element. Correspondingly, the at least one connecting structure may comprise an upper jaw connecting structure and a lower jaw connecting structure.

In particular, the dental model structure comprises:
an upper jaw situation element representing a situation of an upper jaw;
a lower jaw situation element representing a situation of a lower jaw;
an upper jaw connecting structure supporting the upper jaw situation element; and
a lower jaw connecting structure supporting the lower jaw situation element;
wherein the upper jaw situation element and the upper jaw connecting structure are designed and configured to be mounted on an articulator by means of a preselected and prefabricated upper jaw distance element without the need of using further fixation material,
wherein the lower jaw situation element and the lower jaw connecting structure are designed and configured to be mounted on the articulator by means of a preselected and prefabricated lower jaw distance element without the need of using further fixation material, and
wherein the upper jaw situation element, the upper jaw connecting structure, the lower jaw situation element and the lower jaw connecting structure being fabricated by means of a 3D-printer.

In a preferred embodiment, the at least one connecting structure comprises mounting and/or fixing means to be connected with complementary mounting and/or fixing means of a prefabricated distance element. Thus, by means of the mounting and/or fixing means, the at least one connecting structure can be mounted and/or fixed to the distance element, particularly to the mounting plate of the distance element. Preferably, the mounting and/or fixing means may comprise means that firmly fix the connecting structure or a base plate thereof, and thus the dental model structure, to the mounting plate of the distance element, e.g. snapping means for a snapping mechanism.

In a further preferred embodiment, the at least one connecting structure comprises a printing base plate having connecting means for connecting the dental model structure with a mounting plate of the at least one distance element.

According to a further aspect of the present invention, a mounting plate being configured to connect a dental model structure with a distance block is provided. The mounting plate comprises:
fixation means for connecting a first surface of the mounting plate with complementary fixation means of the dental model structure;
a reception for receiving a metal element; and
at least one side recess being formed on a second surface of the mounting plate (18) for enabling a split cast control.

In particular, the mounting plate is configured to connect the dental model structure according to the above described aspect of the present invention with the distance block as described within the present invention. The mounting plate may have a rectangular or quadratic shape. The corners of the mounting plate may be rounded.

The fixation means of the mounting plate may be formed on the first surface of the mounting plate. Preferably, the mounting plate comprises three fixation means. A first fixation means may be arranged and/or formed at a first corner of the mounting plate. A second fixation means may be arranged and/or formed at a second corner of the mounting plate. And a third fixation means may be arranged and/or formed in the middle of a side that is located opposite to the first and second corners. Accordingly, the mounting means are preferably arranged in a triangle. In other words, the mounting means are preferably arranged such that they span a triangular area, i.e., a virtual connecting line which connects the mounting means forms a triangle. A mounting means may be formed as a pin comprising at least one snapping element. The at least one snapping element may be displaced and/or deformed when pressed through a recess or hole (complementary fixation means) of the dental model structure. More specifically, after the at least one snapping element has passed the corresponding hole of the dental model structure, the at least one snapping element is displaced and/or extended such that it cannot be removed, thereby resulting in a firm connection. A pin may comprise two, three or preferably four snapping elements. In particular, the pin may comprise four snapping elements, and the four snapping elements may be arranged to form a mushroom head.

The reception may be formed as a circle, i.e., the reception may have a circular shape. The reception is configured to receive a metal element, particularly a metal plate or a metal disk. The metal element may be formed from a magnetic material. In other words, the metal element comprises or is a magnet. The metal element can be connected by means of a magnetic force with a magnet comprised in a distance block.

The at least one side recess which is formed on a second surface of the mounting plate for enabling a split cast control is formed as a split cast edge, a split cast flank, and/or a split cast side. Preferably, the mounting plate comprises three side recesses. A split cast control, which is well known by a dentist or dental technician, is a control whether the dental model structure is mounted and positioned correctly. For this purpose, the metal element or magnet is removed from the distance block and/or the mounting element. After removing the magnet, the dental model structure, the mounting plate and the distance block are mounted again (but without the magnet) and it is checked whether, due to the omission of the magnetic force, a gap occurs between the mounting plate and the distance block. If no such gap occurs, the dental model structure is mounted and positioned correctly. The occurrence of a gap, on the other hand, is a hint that anything is wrong.

A first side recess may be arranged and/or formed at a first side of the mounting plate. A second side recess may be arranged and/or formed at a second side of the mounting plate. And a third side recess may be arranged and/or formed at a third side of the mounting plate. The first and second side recesses may be formed in proximity to a corner of the mounting plate, i.e. not in the middle of the first and second sides of the mounting plate. The third side recess may be formed in the middle of the third side of the mounting plate. Accordingly, the side recesses are preferably arranged in a triangle. In other words, the side recesses are preferably arranged such that they span a triangular area, i.e., a virtual connecting line, which connects the middle points of the side recesses, forms a triangle. In particular, the at least one side recess is configured and arranged such that the at least one side recess is engageable with at least one complementary structure, e.g. with at least one corresponding protrusion, of the distance block. In a preferred embodiment, the mounting plate comprises the metal element or the magnet being positioned in the reception.

According to a further aspect of the present invention, a dental model system is provided, the dental model system comprising:
the dental model structure according to the present invention; and
the at least one preselected and prefabricated distance element.

The at least one preselected and prefabricated distance element may comprise a distance block. In addition, it may also comprise a mounting plate according to the above described aspect of the present invention. Preferably, the at least one preselected and prefabricated distance element comprises an upper jaw distance element and a lower jaw distance element. By means of the upper jaw distance element, an upper jaw situation element and/or an associated upper jaw connecting structure can be connected with an upper base plate (upper mounting plate) of the articulator. By means of the lower jaw distance element, a lower jaw situation element and/or an associated lower jaw connecting structure can be connected with a lower base plate (lower mounting plate) of the articulator.

Preferably, the upper jaw distance element comprises an upper jaw distance block and an upper jaw mounting plate, wherein the upper jaw distance block comprises connecting means to connect the upper jaw distance block with an upper base plate of the articulator, and wherein the upper jaw mounting plate comprises connecting means for connecting the upper jaw mounting plate with an upper jaw connecting structure of the dental model structure. Correspondingly, the lower jaw distance element preferably comprises a lower jaw distance block and a lower jaw mounting plate, wherein the lower jaw distance block comprises connecting means to connect the lower jaw distance block with a lower base plate of the articulator, and wherein the lower jaw mounting plate comprises connecting means for connecting the lower jaw mounting plate with a lower jaw connecting structure of the dental model structure.

Preferably, each mounting plate (particularly the upper jaw mounting plate and the lower jaw mounting plate) as well as each distance block (particularly the upper jaw distance block and the lower jaw distance block) of the at least one distance element comprises a magnet as connecting or fixing means for connecting and/or fixing the mounting plate with a distance block. Advantageously, such a configuration enables a so-called "split cast control", which is well-known by a dentist and/or dental technician. Furthermore, different distance blocks and mounting plates can easily and quickly be interchanged.

For the above mentioned further independent aspects and in particular for preferred embodiments in this regard, the explanations given above or below concerning the embodiments of the first aspect also hold true. In particular, for one independent aspect of the present invention and for preferred embodiments in this regard, the explanations given above and below concerning the embodiments of the respective other aspects also hold true.

Individual embodiments for solving the problem are described by way of example below with reference to the figures. In this case, the individual embodiments described have in part features which are not absolutely necessary for implementing the claimed subject matter, but which provide desired properties in specific applications. In this regard embodiments which do not have all the features of the embodiments described below are also intended to be regarded as disclosed in a manner coming under the technical teaching described. Furthermore, in order to avoid unnecessary repetitions, specific features are mentioned only with regard to individual embodiments from among the embodiments described below. It is pointed out that the individual embodiments are therefore intended to be considered not only by themselves but also in a joint consideration. On the basis of this joint consideration the person skilled in the art will recognize that individual embodiments can also be modified by inclusion of individual or a plurality of features of other embodiments. It is pointed out that a systematic combination of the individual embodiments with individual or a plurality of features described with regard to other embodiments may be desirable and expedient and is therefore intended to be taken into account and also to be regarded as encompassed by the description. It should be understood that even though embodiments are separately described, single features and functionalities thereof may be combined without prejudice to additional embodiments. The present disclosure is illustrated by way of example and not limited by the accompanying figures.

DETAILED DESCRIPTION OF THE FIGURES

Throughout the figures, same reference signs are used for the same or similar elements.

FIGS. 1 to 3 relate to the prior art but are helpful to understand the present invention. The classical analog workflow is still the most widespread in the dental world, but digitization is rapidly increasing. The goal of the dentist or the dental technician is always to reproduce or simulate the patient's situation as accurate as possible, so that a perfect denture can be produced or a perfect dental treatment can be planned.

In addition, the patient situation should be documented and also be available in the future. In the classical analog workflow, the dental or oral situation (dentate or edentulous) is prepared using impression trays and an impression material such as silicone, alginate, hydrocolloid, etc. For digital purposes, an intraoral scanner is used that assembles individual images into a 3D object and creates a digital data file of meshes. These negative impressions are filled with dental gypsum. Now, it is possible to digitize the impressions in the impression tray by means of a desktop scanner. Most widespread, however, is the scanning of the poured analog plaster models. In the analog operation, the model is positioned in the articulator. The anatomical position is determined with a transfer bow, or alternatively, standard position values are used. The analog models are connected to the articulator by mounting with dental stone to a mounting plate or holding the models in position with a 3D claw. This spatially fixed model situation can be digitized again with desktop scanners, in order to be then used, e.g., to superimpose and replace the gypsum scan with an intraoral scan (so as to be able to make a possible error correction). The intention of the dentist and dental technician is always to have the models as patient-specific as possible, so that at the end, when the final work (e.g. a prosthesis) is inserted into the patient's mouth, the maximum error tolerance of 20 μm (which is thinner than a human's hair), is not exceeded.

Figure 1A:
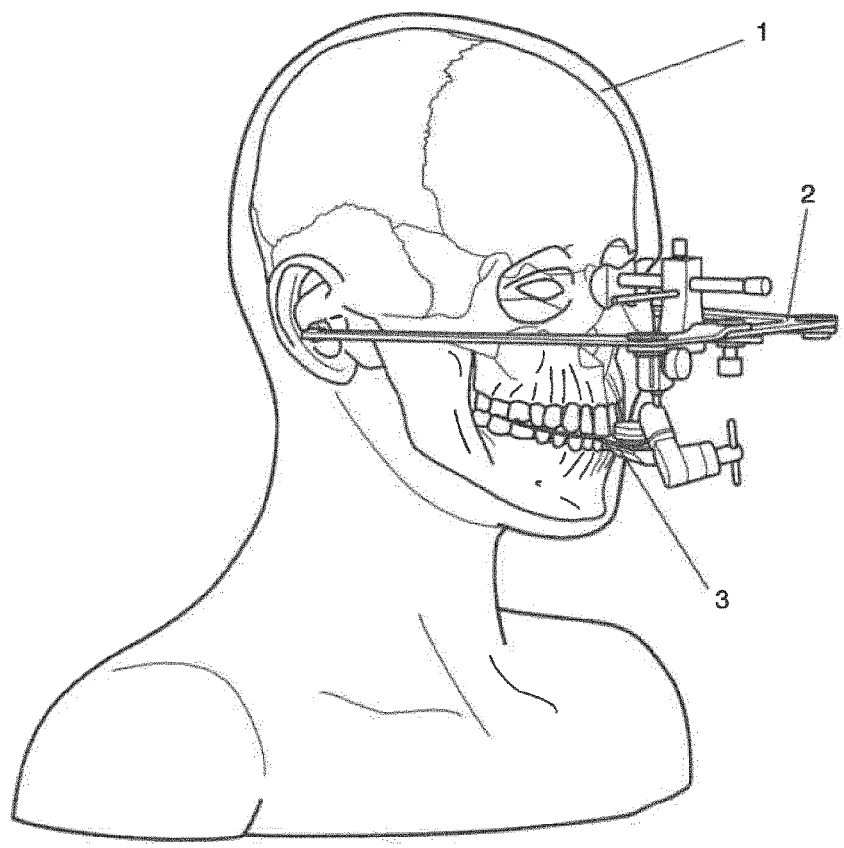
FIG. 1a shows a schematic representation of a conventional facebow mounted on a patient's head.
Figure 1B:
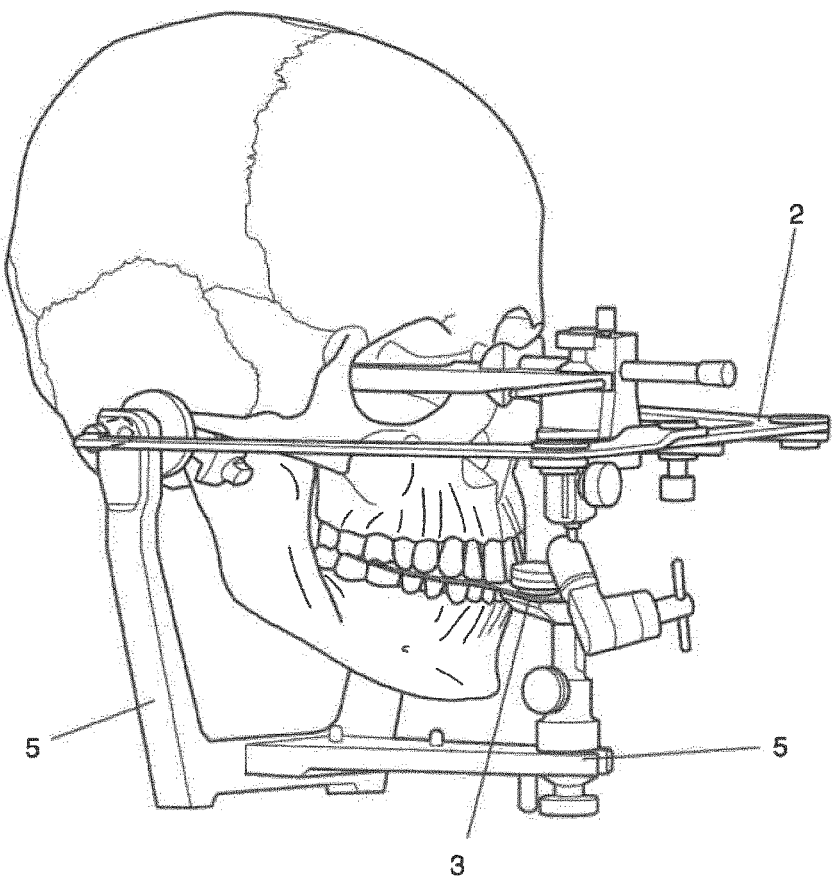
FIG. 1b shows a schematic representation of a conventional articulator acting as a patient simulator and including the facebow shown in FIG. 1.

FIG. 1a shows a schematic representation of a conventional facebow 2 which is mounted on a patient's head 1 in order to obtain data relating to the cranium of the patient in order to obtain positioning data relating to the position of the teeth with respect to the cranium. For obtaining these data, the patient bites on a bite fork 3 of the facebow 2, and the facebow 2 is fixed to predefined points of the patient's head such as the "porion", "nasion", "*glabella*", and "eye socket". The obtained data can then be transferred to an articulator 5 as shown in FIG. 1b together with the facebow 2 being mounted on the articulator 5. The articulator 5 now serves as a simulator for the patient as the articulator plane corresponds to the patient plane. The data obtained by means of the facebow, particularly the positioning data, can be used to correctly position or align a dental model within the articulator 5.

Figure 2A:
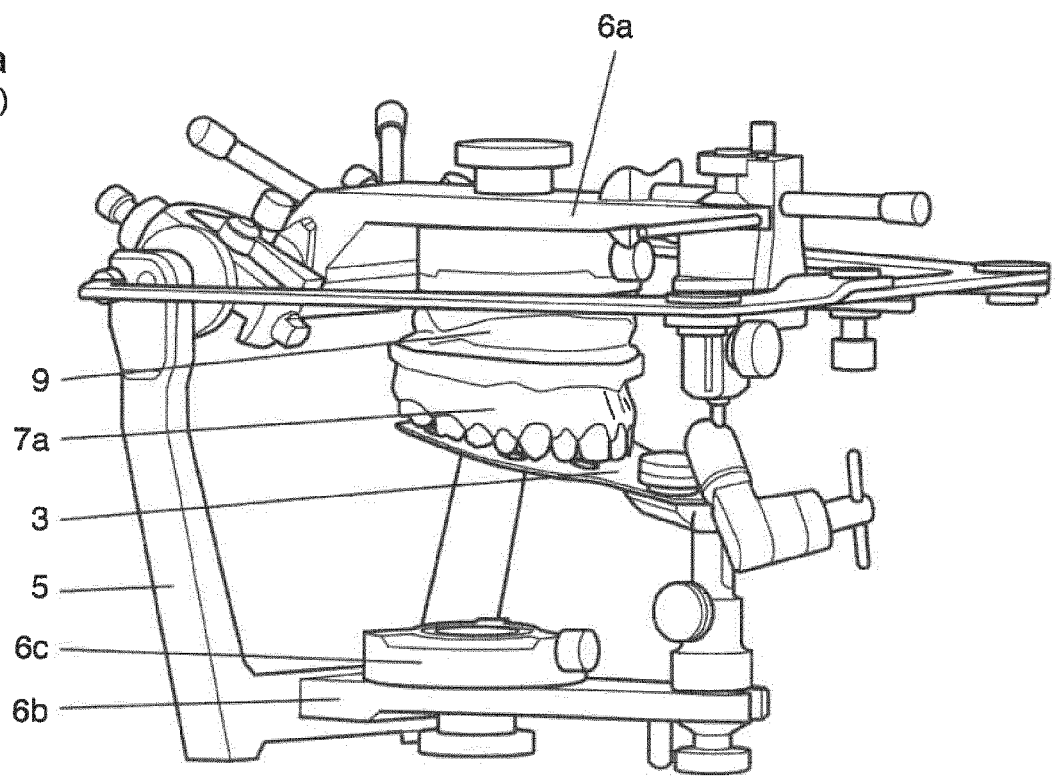
FIG. 2a shows an upper jaw part of a conventional analog dental model which is mounted on an articulator by means of gypsum.
Figure 2B:
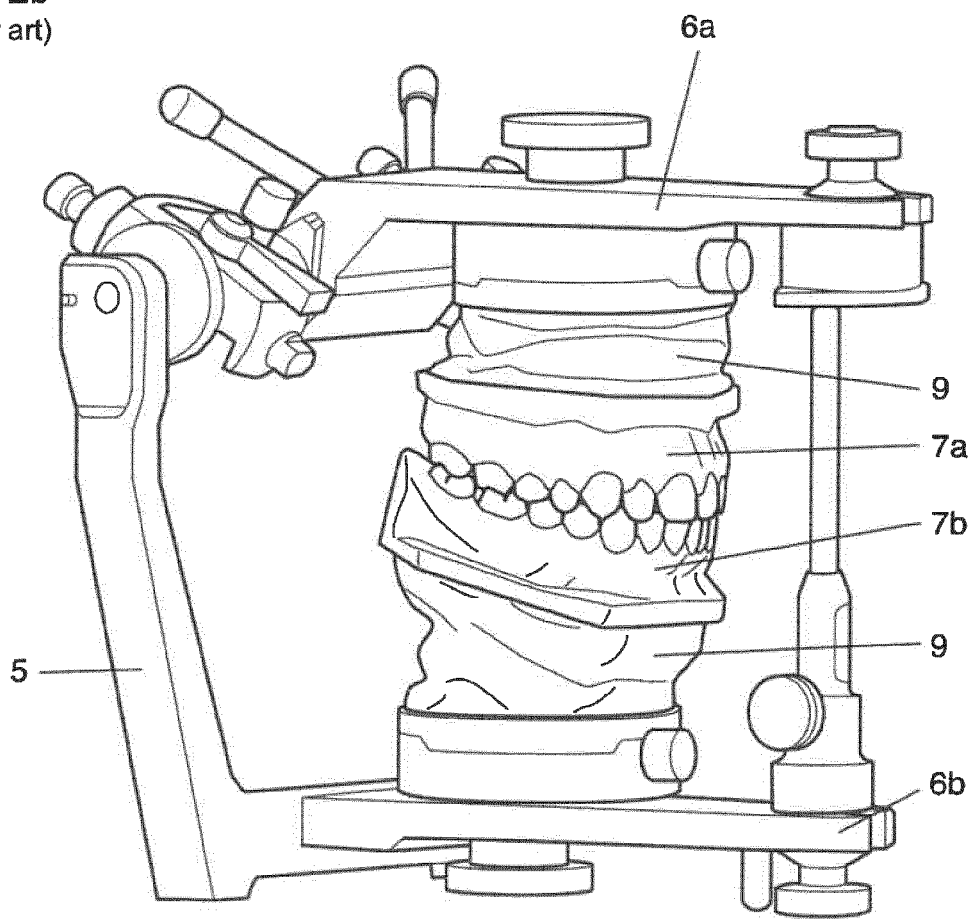
FIG. 2b shows the conventional analog dental model of FIG. 2a including the upper jaw part and a lower jaw part, which is mounted on an articulator by means of gypsum.

FIGS. 2a and 2b illustrate the conventional process of mounting an analog dental model on the articulator 5. In this conventional method, it is necessary to plaster the dental model in order to be mounted and fixed between an upper base plate 6a and a lower base plate 6b of the articulator. FIG. 2a shows an upper jaw part 7a of the dental model being plastered with gypsum 9 and thereby fixed to the articulator 5. FIG. 2b shows both the upper jaw part 7a and the lower jaw part 7b of the dental model being fixed to the articulator 5 by using gypsum 9.

Figure 3A:
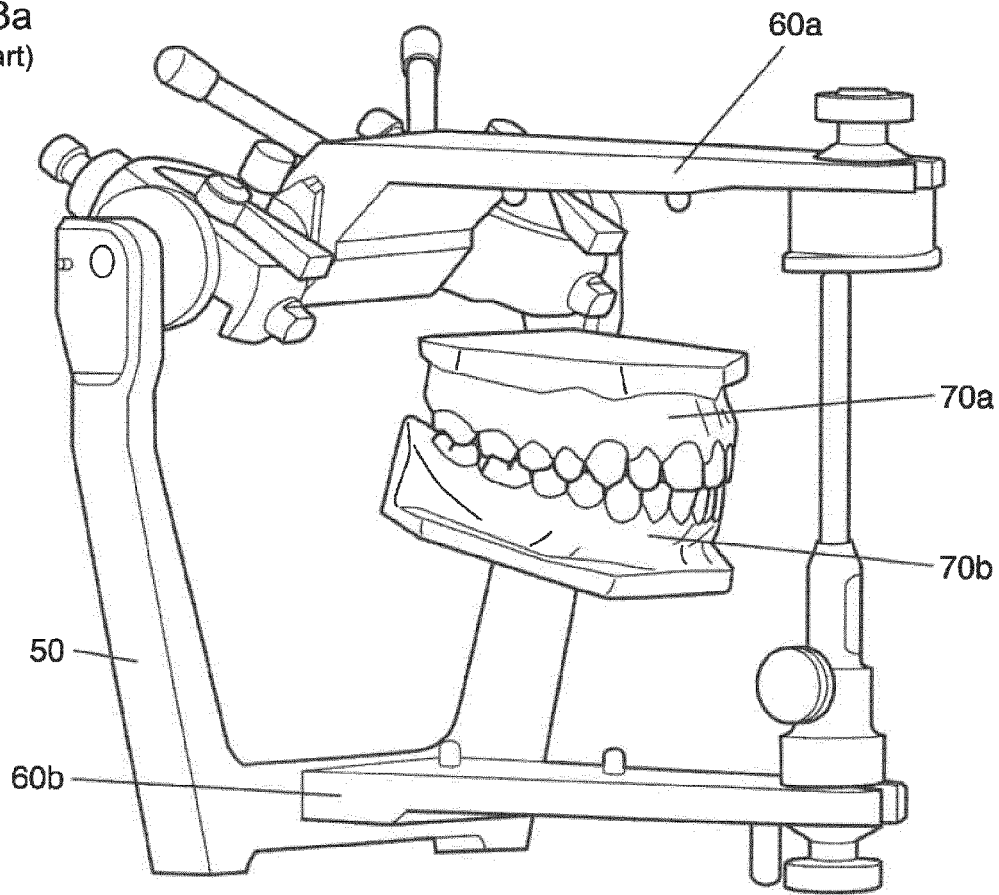
FIG. 3a shows a virtual representation of a scanned dental model as conventionally displayed in a virtual articulator.

In order to digitize the analog dental models, a desktop scanner is conventionally used for scanning the analog models, thereby generating scanned dental models in form of a digital data set. FIG. 3a illustrates how these scanned or digital dental models 70a, 70b are conventionally displayed in a virtual articulator 50, i.e. a virtual representation of the real articulator 5. As shown in FIG. 3a, the scanned dental models 70a, 70b are usually displayed in a floating position without the gypsum 9 which is only necessary for mounting the analog dental models 7a, 7b on the real articulator 5.

Figure 3B:
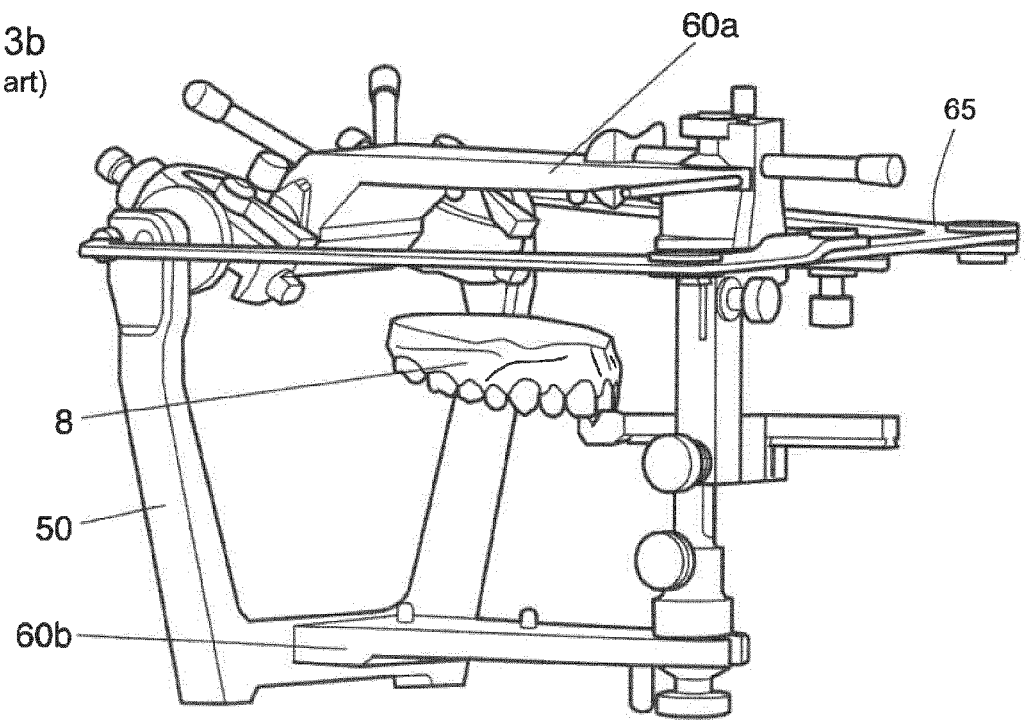
FIG. 3b shows a virtual representation of a dental situation data set as conventionally displayed in a virtual articulator, and a virtual facebow with a transfer assembly.

Another option of displaying dental models in a virtual articulator is using an intraoral scanner in order to obtain a dental situation data set representing a dental situation. This dental situation can then be graphically displayed on a display as a virtual representation of the dental situation data set. FIG. 3b shows such a virtual representation of a dental situation data set 8 being positioned between base plates 60a and 60b of a virtual articulator 50. Usually, a surface of the virtual representation of a dental situation data set 8 is not smooth. Rather, the virtual representation of a dental situation data set 8, i.e. the teeth scan or 3D-scan, obtained by an intraoral scanner has a rough surface. The rough surface particularly results from the measurement carried out with the intraoral scanner. Thus, by using an intraoral scanner, the dental situation can conventionally be displayed digitally in connection with a virtual articulator. However, up to now, it was not possible or practical to use the dental situation data set received from the intraoral scanner to fabricate an analog dental model which can directly (i.e. without the need of plastering the dental models using gypsum, as described in connection with FIGS. 2a and 2b) be mounted on a real articulator. This is because 3D-printing a dental model structure that can directly be mounted on a real articulator would require a height that is equal to the distance between the mounting plates 6a and 6b of the articulator 5. If at all possible by using commercially available 3D-printers, printing such a large structure would take very long (e.g. several hours) and would be very expensive. Accordingly, the conventionally available procedures for switching between the digital and analog world with respect to dental models are no practical solution for dentists or dental technicians.

In FIGS. 4 and 5, the principle of the present invention is illustrated by way of example.

Figure 4A:
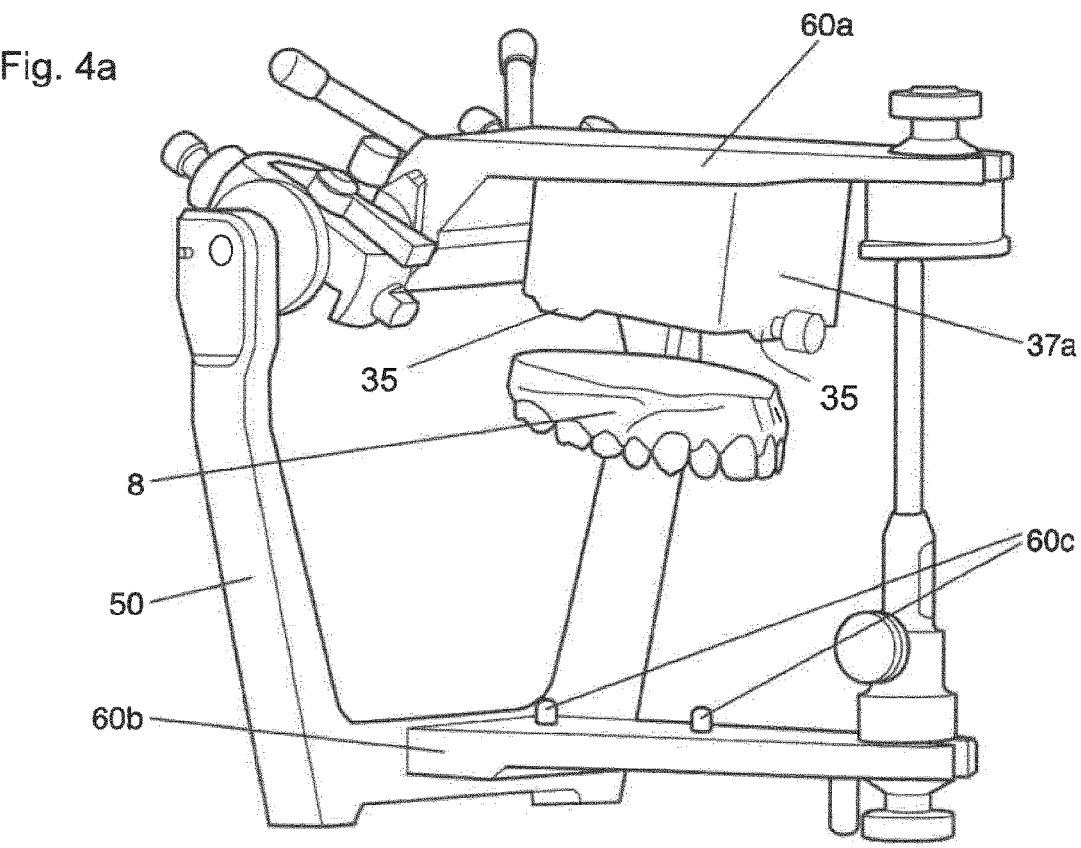
FIG. 4a shows a virtual representation of a dental situation data set positioned in a virtual articulator together with a predefined distance block for illustrating the principle of the present invention.
Figure 7:
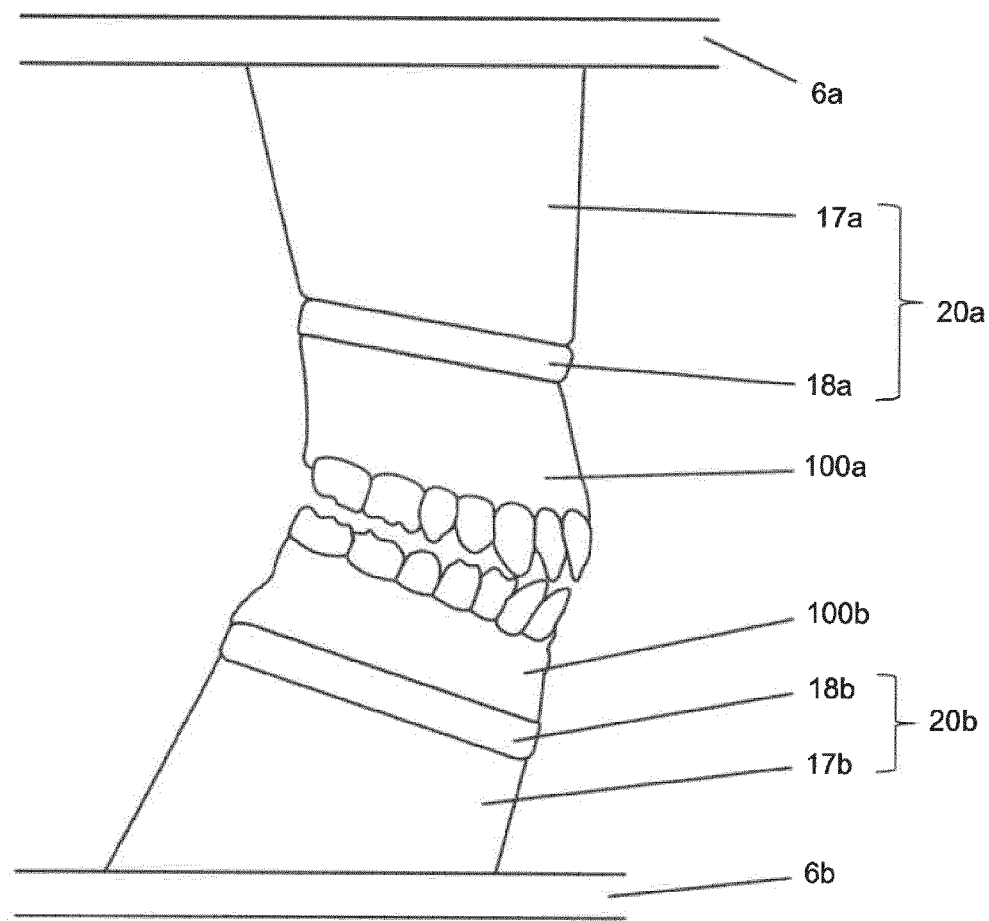
FIG. 7 shows a schematic representation of a dental model structure mounted between the base plates of an articulator by means of distance elements, in accordance with a preferred embodiment of the present invention.
Figure 8:
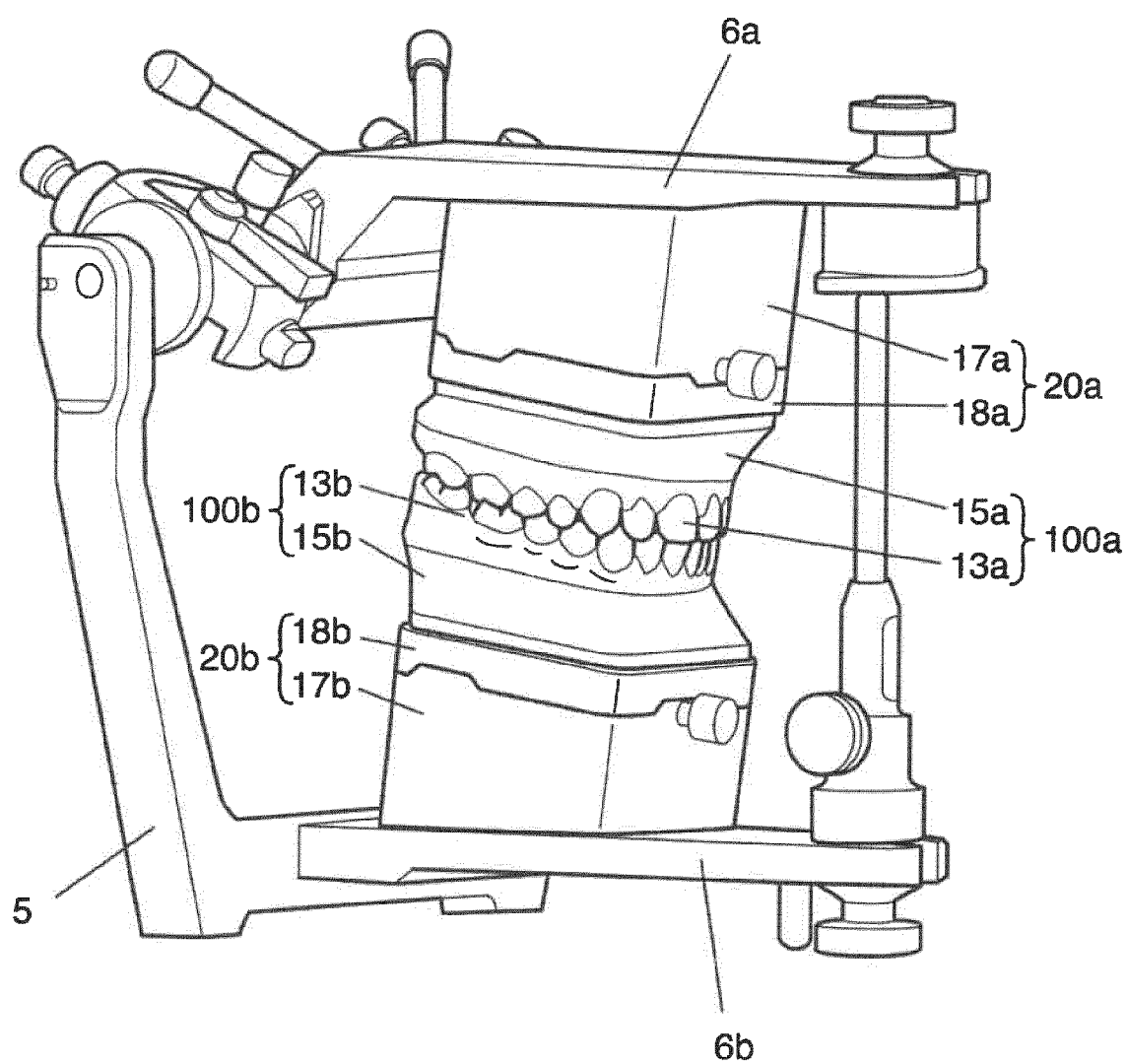
FIG. 8 shows a further schematic representation of a dental model structure mounted between the base plates of an articulator by means of distance elements, in accordance with a preferred embodiment of the present invention.

In particular, FIG. 4a shows a virtual representation of a dental situation data set 8 positioned in a virtual articulator 50 together with a virtual representation 37a of a predefined distance element or distance block 17a (see FIGS. 7 and 8). The distance element exemplary shown in FIG. 4a is an upper jaw distance block, as it is used in connection with an upper jaw dental model structure. Similarly, a lower jaw distance element (not shown in FIG. 4a) is provided for use in connection with a lower jaw dental model structure. The predefined distance block (upper jaw or lower jaw distance block) has a predefined height and is one of a plurality of distance blocks comprised in a predefined set (relating to the upper jaw or lower jaw) of distance blocks, wherein each distance block of the predefined set of distance blocks has a predefined height that differs from the heights of the remaining distance blocks of the set. For example, a set of distance blocks may comprise four distance blocks with different heights. By providing a set of distance blocks with different heights, it is possible to select the distance block which suits best with respect to the present dental model and the present articulator. Usually, the distance block having a height that is maximal possible with regards to the dental situation data set and the articulator data set is chosen. In this way, the dental model structure to be printed is as small as possible, thereby reducing printing time and printing costs.

A distance block can be prefabricated and used in connection with a mounting plate (see e.g. FIG. 4b) to directly mount a printed dental model structure 100 according to the present invention (see FIGS. 6 to 8) on a real articulator. The distance block used for mounting the printed dental model structure 100 according to the present invention has been selected when designing the dental model structure 100.

Figure 4B:
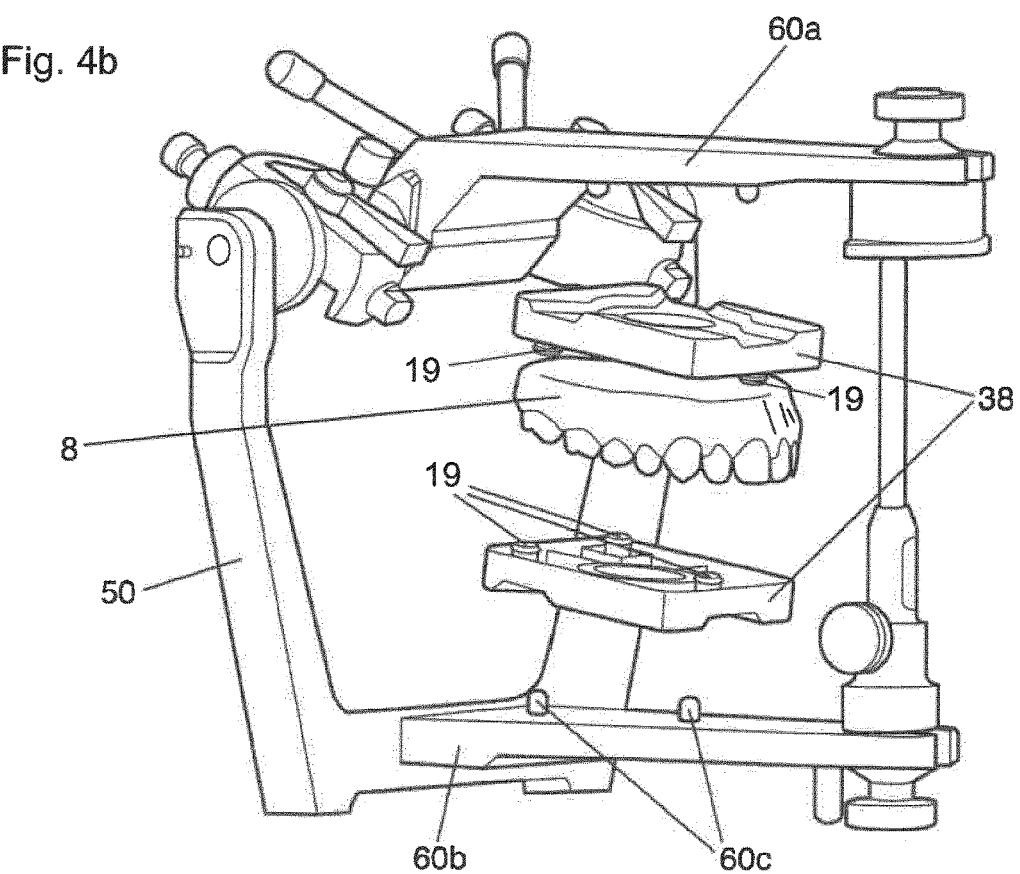
FIG. 4b shows a virtual representation of a dental situation data set positioned in a virtual articulator together with predefined mounting plates for further illustrating the principle of the present invention.

FIG. 4b shows the virtual representation of the dental situation 8 positioned in the virtual articulator 50 together with virtual representations 38 of predefined mounting plates 18 (see FIGS. 7 and 8). The distance block is omitted in FIG. 4b. Instead, two mounting plates 18 (virtually represented by 38), one for the upper jaw and one for the lower jaw, are shown. The upper jaw mounting plate 18a is configured to connect the printed dental model structure 100 (see FIGS. 6 to 8) with the distance block 17a. For this purpose, the mounting plates comprise a magnet or a magnetic layer as connecting means to be connected with a magnet (complementary connecting means) of a distance block. This connection mechanism enables a split cast control for the dentist or dental technician, i.e. a control whether the dental model structure is mounted and positioned correctly. Generally, it is possible to omit the mounting plate and merely use the distance block 17a (virtually represented by 37a) as a distance element for mounting the printed dental model structure on the articulator, as it is indicated by FIG. 4a. However, in this case, a split cast control would not be possible. Therefore, it is preferred to use a distance element comprising the distance block 17a (virtually represented by 37a) and a mounting plate 18 (virtually represented by 38), as shown in FIG. 4b. As can be seen from FIG. 4b, the mounting plate 18 (virtually represented by 38) has at least one, particularly three, snapping pins 19 serving as fixing means to fix the mounting plate 18 to the printed dental model structure 100. The at least one snapping pin 19 may comprise at least one elastic element that is deformed and/or displaced when pressed through a hole, thereby resulting in a firm connection.

Figure 5A:
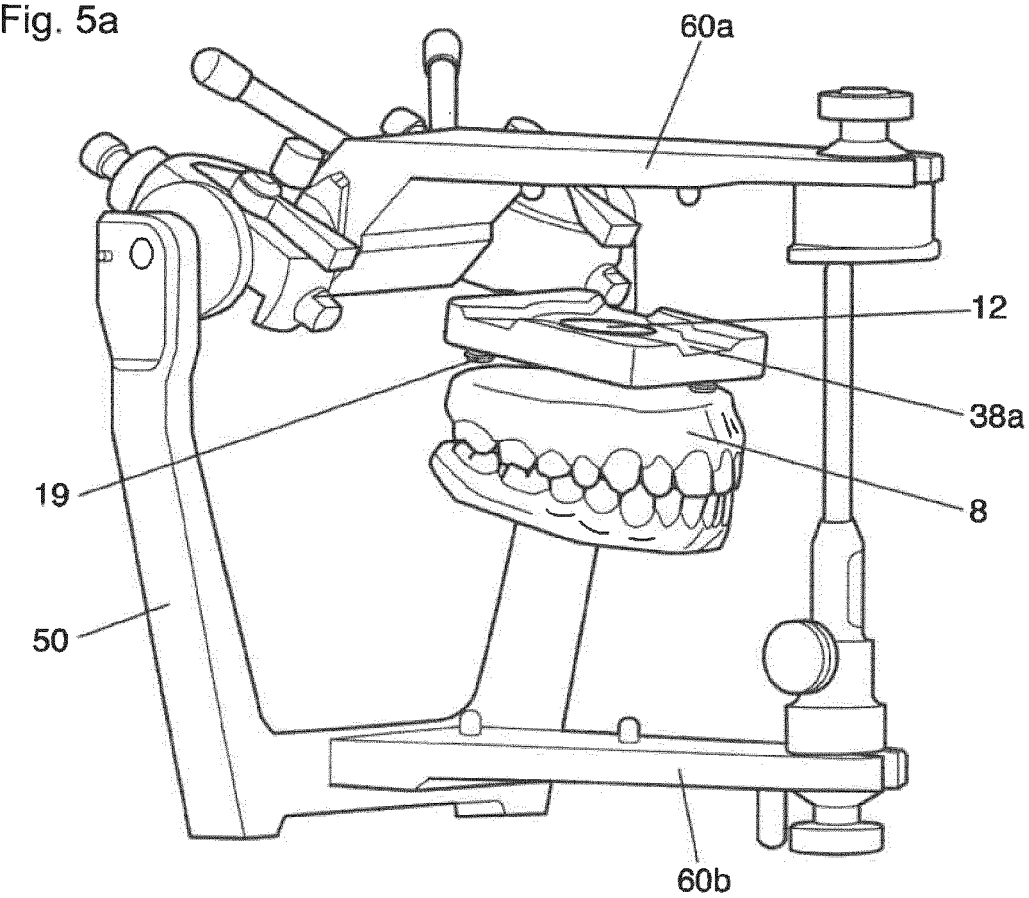
FIG. 5a shows a virtual representation of a dental situation data set positioned in a virtual articulator together with a predefined mounting plate for further illustrating the principle of the present invention.

FIG. 5a shows the virtual representation of a dental situation data set 8 positioned in the virtual articulator 50 together with a virtual representation 38a of the predefined mounting plate 18a. The distance block has been faded out in this figure in order to show the surface of the mounting plate. As can be seen in this illustration, the mounting plate 18a (virtually represented by 38a) comprises a recess 12 which acts as a reception for a magnet (a so-called "split cast reception"). The lower surface of the mounting plate, which faces the 3D-scan 8, has to be connected with the dental model. For this purpose, a virtual connecting structure (not shown in FIG. 5a) is generated by the software, which connects the 3D-scan 8 with the virtual representation 38a of an inner side of the mounting plate via fixation means or pins 19 (see, e.g., FIG. 5b).

Figure 5B:
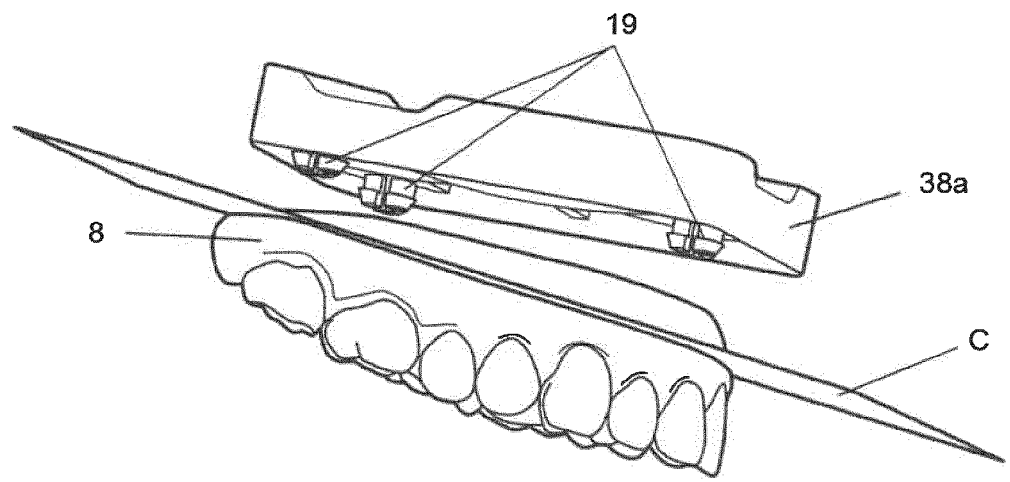
FIG. 5b shows a virtual representation of a dental situation data set, a virtual representation of a mounting plate and a cutting plane for further illustrating the principle of the present invention.

FIG. 5b shows a virtual representation of a dental situation data 8 set and a virtual representation of a mounting plate 18. Furthermore, a cutting plane C is shown that is used for trimming the virtual representation of the dental situation to an essential part. The definition of such a cutting plane C is explained in more details below in connection with FIGS. 9a and 9b.

Figure 6A:
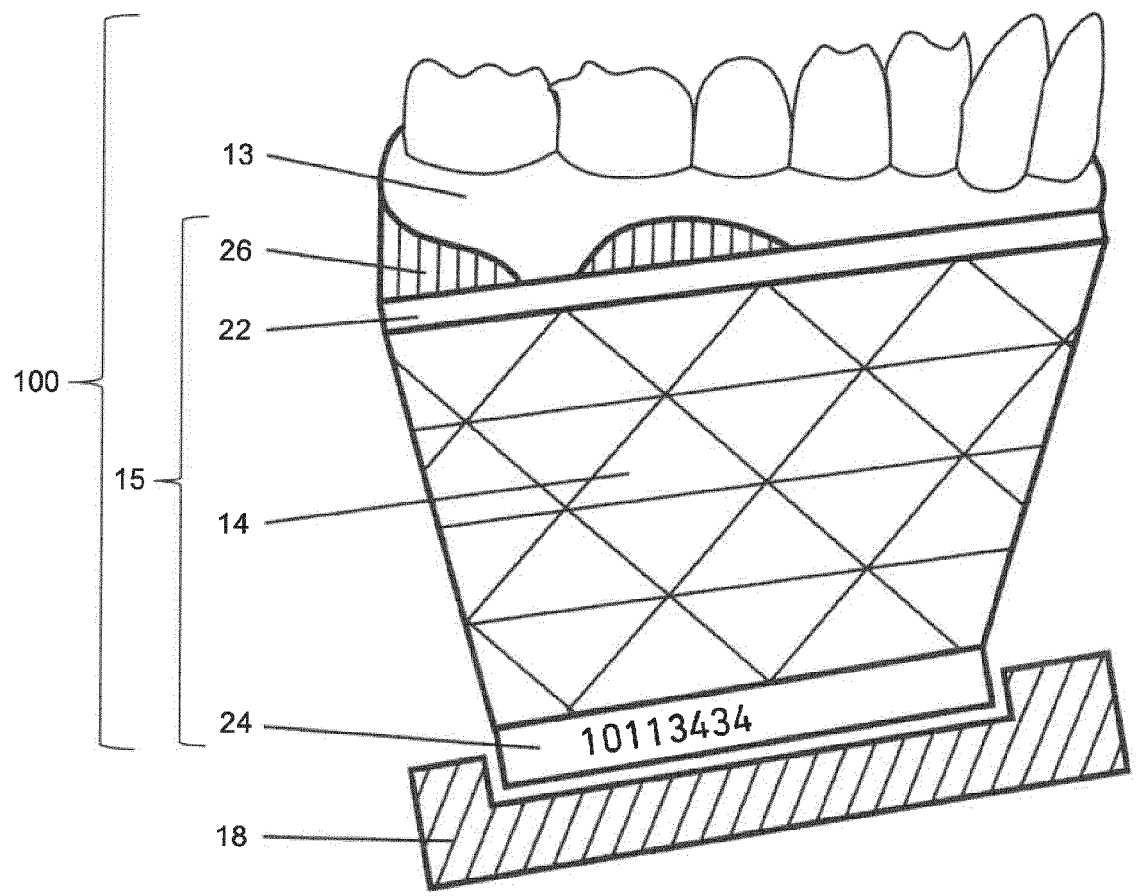
FIG. 6a shows a schematic representation of a dental model structure positioned in a predefined mounting plate, in accordance with a preferred embodiment of the present invention.

FIG. 6a shows a schematic representation of a dental model structure 100 which is positioned in a predefined mounting plate 18, in accordance with a preferred embodiment of the present invention. The dental model structure 100 comprises a dental situation element 13 and a connecting structure 15. The connecting structure 15 is formed by a platform 22, a mesh structure 14 and a printing base plate 24. The mesh structure 14 is arranged between the platform 22 and the printing base plate 24. The platform 22 faces and/or abuts the dental situation element 13. The dental situation element 13 and the connecting structure 15 are fused together to form the unitary dental model structure 100. The dental situation element 13 results from a 3D teeth scan. As explained in more details below, this 3D teeth scan has been trimmed and smoothed. Holes 26 which may be left after cutting (also described below) have been closed by projecting of the boundaries towards a cutting plane. Each pair of points along a mesh boundary line is projected to a corresponding pair of points onto the cutting plane, thereby creating two mesh triangles between those four points. After having generated all those layers, they are fused with the 3D-scan at co-located points. The mesh boundary line of the resulting mesh is completely flat and lies on the cutting plane. An upper boundary line of the platform 22 is the convex hull of the mesh boundary line of elements 13 and 26 on the cutting plane. A lower boundary line of the platform 26 is a slightly offset approximation of this upper convex hull with equidistant points. The mesh structure 14 connects the lower boundary line of the platform 22 with an upper boundary line of the printing base plate 24. Since both of these boundary lines are convex, this connection is simply comprised of interpolated strips of triangles, as indicated in FIG. 6. The printing base plate 24 is a predefined plate which is configured to interface or to be connected with a prefabricated distance element, particularly with a prefabricated mounting plate 18. In particular, as shown in FIG. 6, a code number is engraved on a visible side of the printing base plate 24. This code may relate to specific information such as an order number and/or a patient number and/or the size or height of the selected distance block.

After all these subshells have been generated, the software fuses them together on co-located points and closes any remaining simple holes, such as the flat regions on the cutting plane between elements 26 and 22, with standard algorithms.

Figure 6B:
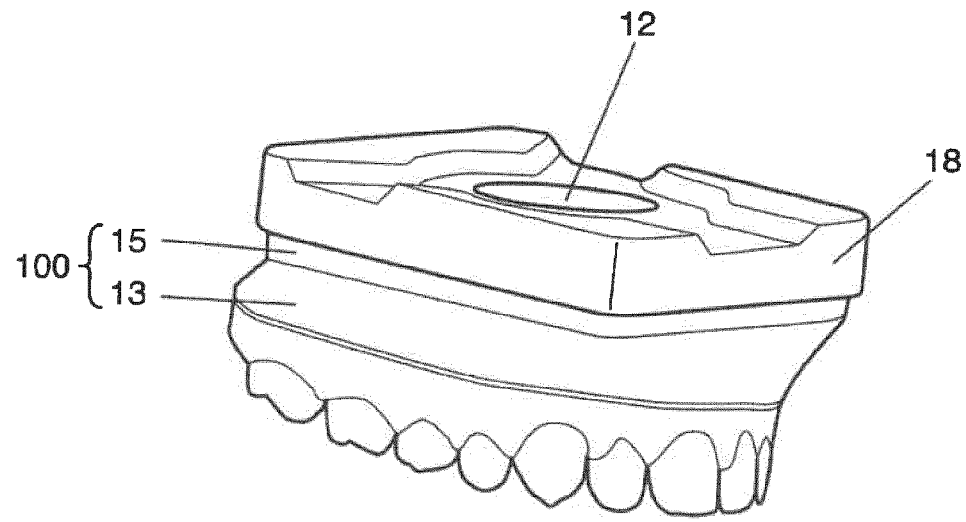
FIG. 6b shows a dental model structure according to an example of the present invention, being mounted on a predefined mounting plate.

FIG. 6b shows a schematic representation of a printed dental model structure 100 according to an example of the present invention, which is mounted on a predefined mounting plate 18. The dental model structure 100 comprises a dental situation element 13 and a connecting structure 15 as mentioned above. The printed dental model structure 100 comprises fixation means (particularly recesses or holes) that are formed on a printing base plate of the dental model structure 100. Preferably, the dental model structure 100 comprises three or more recesses or holes. By pressing the dental model structure 100 against the mounting plate 18, the pins 19 (see FIG. 5a) of the mounting plate 18 engage with the fixation means of the dental model structure 100, thereby firmly connecting the dental model structure with the mounting plate 18. As a result, the dental model structure 100 and the mounting plate 18 form a stable unit. This stable unit can then be connected, e.g. by means of magnets, with the distance block, as indicated by FIGS. 4a and 4b. Furthermore, the mounting plate 18 comprises a reception 12 for arranging a magnet therein. More details concerning the mounting plate 18 are described in connection with FIGS. 13a and 13b below.

FIG. 7 shows a schematic representation of an upper jaw model structure 100a and a lower jaw model structure 100b, mounted between an upper base plate 6a and a lower base plate 6b of an articulator by means of an upper jaw distance element 20a and a lower jaw distance element 20b. The upper jaw distance element 20a comprises an upper jaw distance block 17a and an upper jaw mounting plate 18a.

The lower jaw distance element 20b comprises a lower jaw distance block 17b and a lower jaw mounting plate 18b. The upper jaw model structure 100a is connected to the upper jaw distance block 17a via the upper jaw mounting plate 18a. The lower jaw model structure 100b is connected to the lower jaw distance block 17b via the lower jaw mounting plate 18b.

The upper jaw model structure 100a and the lower jaw model structure 100b are the respective 3d-printed derivatives of the individual teeth scans. They comprise the original teeth scans and algorithmically generated connecting geometry that extends the scans towards the prefabricated mounting plates 18a, 18b. As already mentioned above, the distance blocks 17a and 17b are available in several sizes and are employed to reduce the 3D-printing volume, and thus printing time and costs. All those parts together are then connected to the upper and lower articulator base plates 6a and 6b, respectively.

FIG. 8 shows a further schematic representation of an upper jaw model structure 100a and a lower jaw model structure 100b, mounted between an upper base plate 6a and a lower base plate 6b of an articulator 5 by means of an upper jaw distance element 20a and a lower jaw distance element 20b. The distance elements 20a, 20b, particularly the distance blocks 17a, 17b, may be screwed onto the respective base plates 6a, 6b. In addition or alternatively, a magnetic connection mechanism may be used to fix the distance elements 20a, 20b, particularly the distance blocks 17a, 17b, to the respective base plates 6a, 6b.

3D geometry which is created by dental 3D-scanners such as an intraoral scanner and which is required by 3D-printers comprises a triangle mesh. Particularly the mesh boundary line of intraoral scans (IOS) is often topologically complex and makes the generation of the connecting geometry difficult, as 3D-printers require a watertight model (i.e. no holes) without any self-intersections.

The generation of the virtual connecting structure comprises several semi-automatic processing steps. Full automation using only default parameters is feasible as well. In particular, these processing steps comprise one or more of the following:

a) Definition of the bite area plane;
b) Definition of the cutting planes and trimming;
c) Smoothing of teeth scan boundaries, if necessary; and
d) Generating the connecting structure.

Steps a), b) and c) cut away the uninteresting or disruptive parts of the 3D teeth scan meshes, whereas step d) generates new connecting geometry to finish the 3D-printable model. In the following, steps a) to d) are described in detail in connection with FIGS. 9 to 10.

Figure 9A:
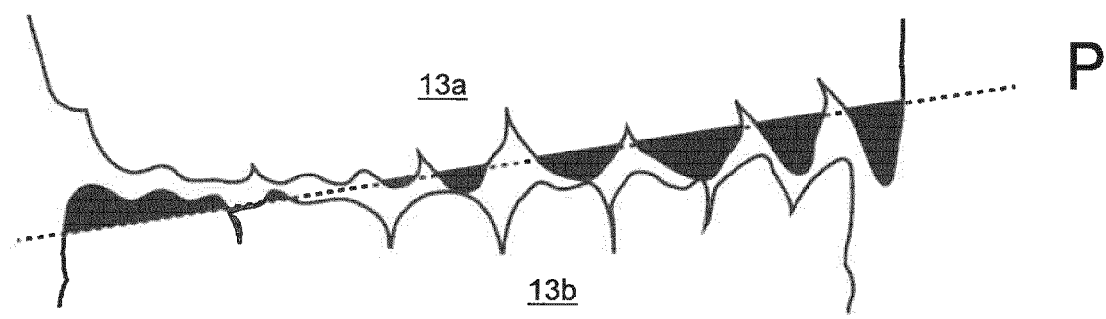
FIGS. 9a-b shows schematics illustrating the definition of the bite area plane in accordance with a preferred embodiment of the present invention.
Figure 9B:
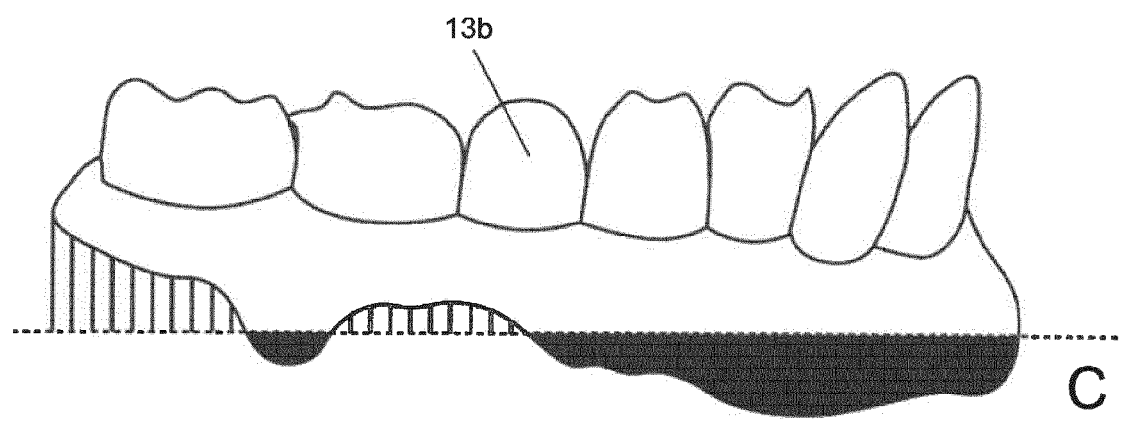

FIGS. 9a-b shows schematics illustrating the definition of the bite area plane. While using dental models in an articulator, the focus is on the actual teeth, so geometry that is far from those teeth can be trimmed away. For this purpose, planes as cutting functions may be used as described below, but also any other algorithms are possible as well, particularly if a segmentation of the teeth from the model is available. While a direct definition of these cutting planes is possible by means of user interactions, known facts help to simplify or even automate this step. The approximate bite area plane is a good description of where the teeth are. It is also a good estimation for the orientation of the cutting planes. In the standard case, one maxilla and one mandibula in occlusion are processed together. The approximate bite area plane is then found by solving the following non-linear least squares optimization problem: A rough initial estimation of the plane results from the known general orientation of the denture in space. FIG. 9a shows the upper and lower jaw in occlusion, as well as a current guess for the bite area plane P. The error measure for this situation is shown in black, namely the amount of geometry on the wrong side of the plane P, i.e., mandible geometry above the plane P and maxilla geometry below the plane P. In detail, this geometry is approximated by mesh points at the wrong side of the plane weighted by their squared distance from the plane. Minimizing this error from the rough initial estimation quickly leads to a plane directly in the area of overlapping teeth. In the non-standard case of a single jaw, user interaction can be employed to find a bite area plane, e.g., by clicking three specified points on the jaw model.

The actual cutting planes (see, e.g., plane C in FIG. 9b) are defined by offsetting the determined bite area plane P. Standard values for the offsets may be used for fully automated processing, but these offsets may be individually fine-tuned by user interactions. After the cutting planes have been determined and/or defined, all teeth scan geometry on the far side of these planes are trimmed away, thereby leaving only the geometry between the two cutting planes, i.e. the essential part, intact.

Figure 10A:
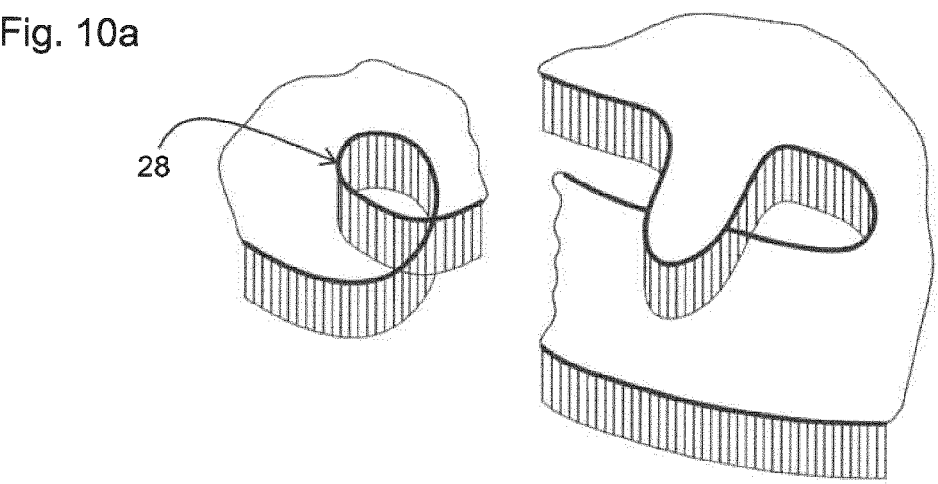
FIGS. 10a-c show schematics illustrating a smoothing of teeth scan boundaries in accordance with a preferred embodiment of the present invention.

If the initial 3D teeth model is closed (or watertight), trimming it with the cutting plane creates a 3D mesh boundary line (3d-MBL) that lies completely on the cutting plane. A flat boundary line like this is required for the following connecting structure generation steps. However, if the initial teeth scan is not a closed 3D-model, which is especially the case for intraoral scans (IOS), trimming it with the cutting plane may leave holes between the cutting plane and the teeth scan. FIG. 9b shows an exemplary result of trimming an IOS with a cutting plane C. The black areas of FIG. 9b are removed and the 3D-MBL in these areas will thus be flat on the cutting plane C. However, there might be gaps that need to be filled (indicated in FIG. 9b by stripes), especially at the back of the model. Since filling these gaps has no functional reason other than making the final part watertight and 3D-printable, a straight orthogonal projection of the 3D-MBL onto the cutting plane C can be used. As the 3D-MBL is an arbitrarily complex 3D-line in space, this projection creates two problems—one rather serious, the other merely cosmetic. The serious problem is that the 3D-MBL might create self-intersecting geometry during projection onto the cutting plane C, which usually prevents 3D-printing. FIG. 10a shows two examples of such self-intersections when projecting a 3D-curve onto a 2D plane. The cosmetic problem is that the IOS meshes are often quite chaotic, containing holes, islands, as well as elongated half-islands. During projection, this creates unnecessarily complex geometry. In other words, some kind of cleaning and smoothing of the 3D-MBL is required before projection.

Figure 10B:
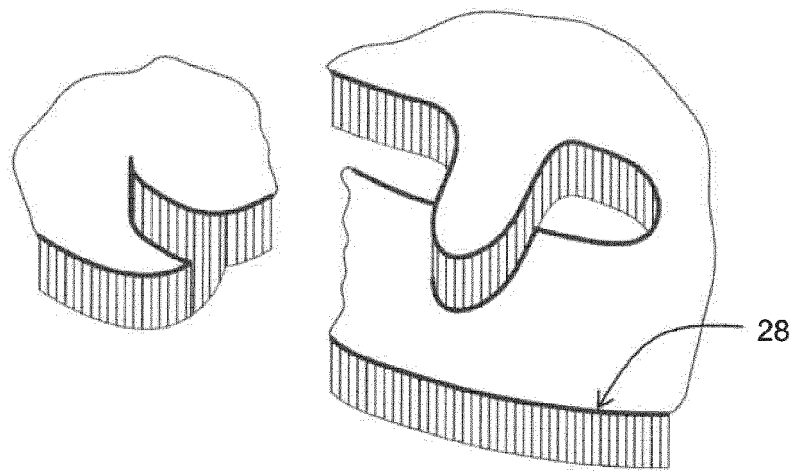
Figure 10C:
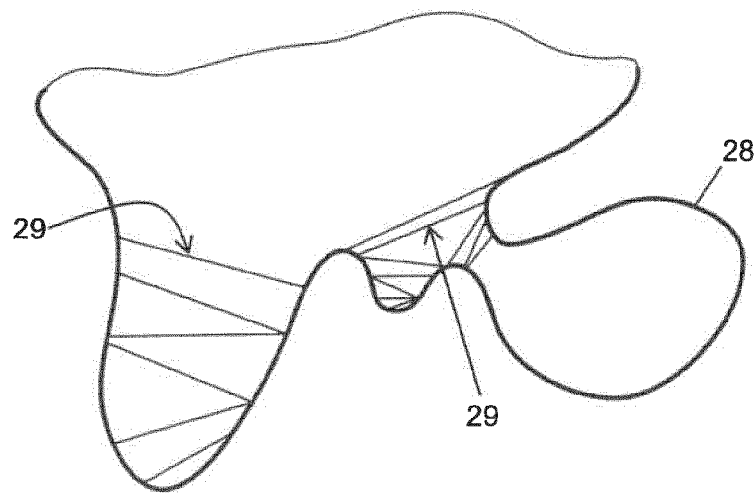
Figure 11A:
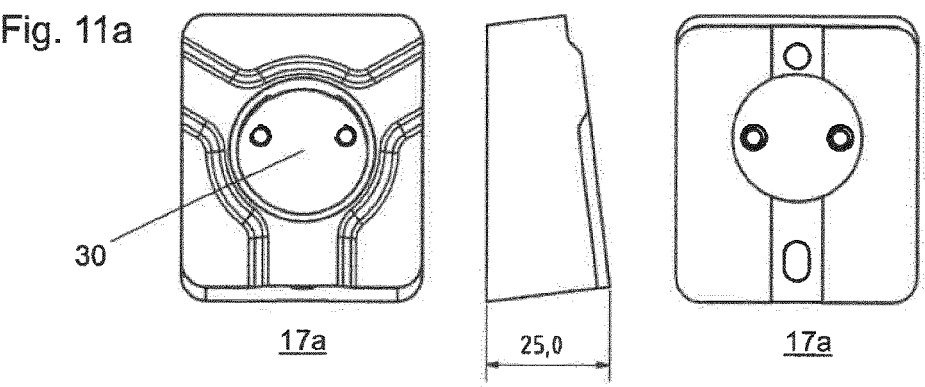
FIGS. 11a-d show schematic representations of exemplary predefined upper jaw distance blocks having different heights, used in connection with the present invention, wherein each figure respectively shows an upper jaw distance block with a predefined height in a bottom view on the left hand side, a side view in the middle, and a top view on the right hand side.
Figure 11B:
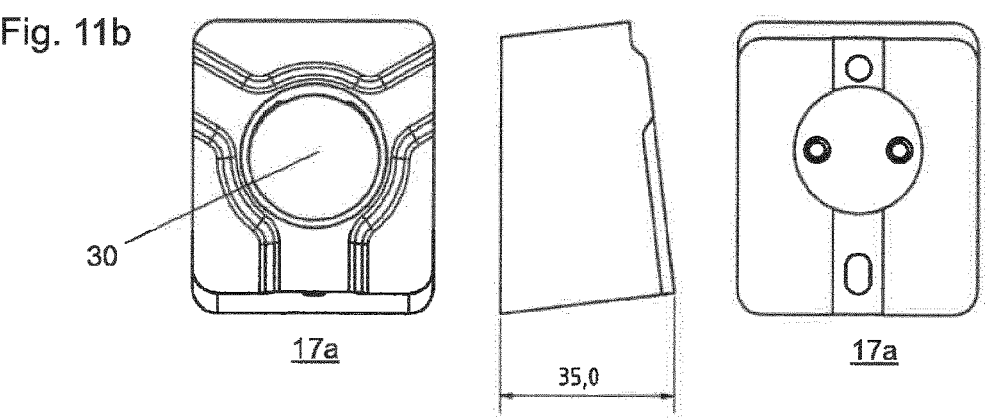
Figure 11C:
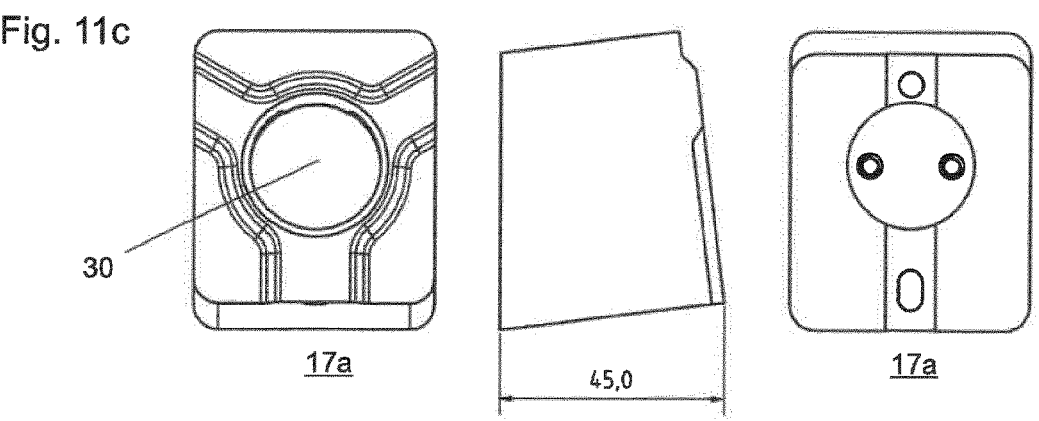
Figure 11D:
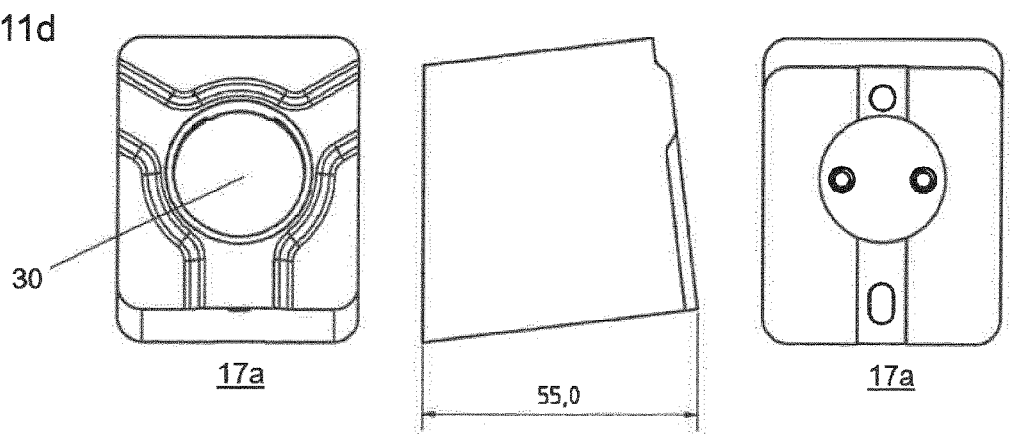
Figure 12A:
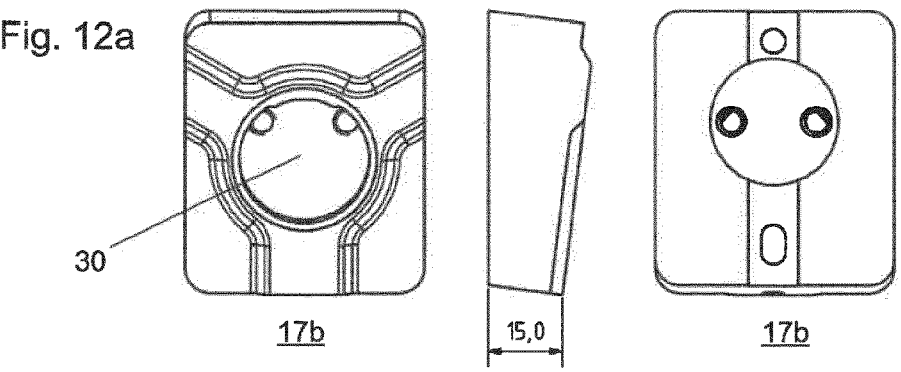
FIGS. 12a-d show schematic representations of exemplary predefined lower jaw distance blocks having different heights, used in connection with the present invention, wherein each figure respectively shows a lower jaw distance block with a predefined height in a bottom view on the left hand side, a side view in the middle, and a top view on the right hand side.
Figure 12B:
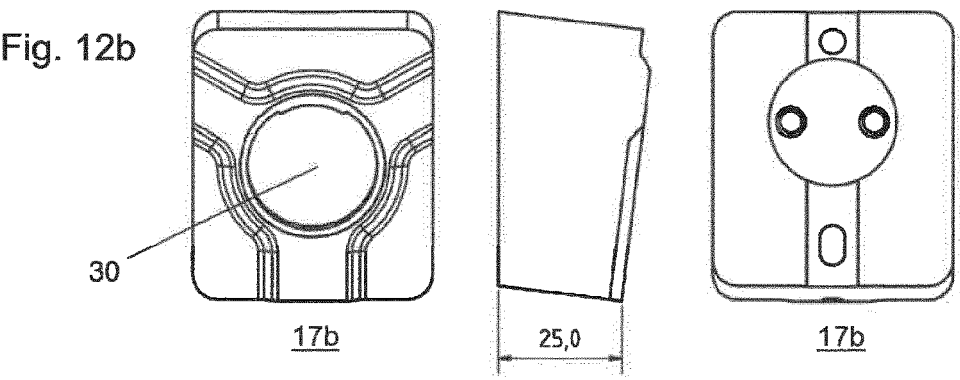
Figure 12C:
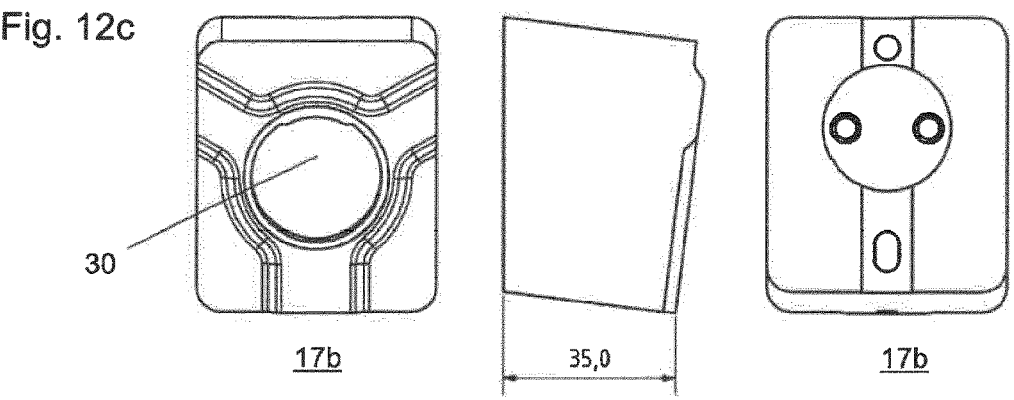
Figure 12D:
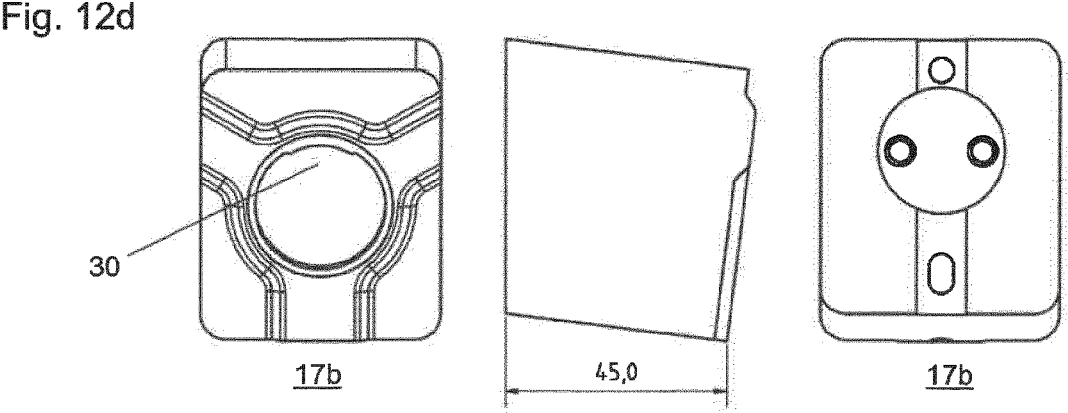

In a first step, all geometry in lower areas of self-overlapping zones to be removed are marked. In other words, if the projection of the 3D-MBL 28 onto the cutting plane overlaps itself, the higher mesh area of the overlap is untouched, whereas the lower mesh area within the created overlap zone is marked for removal. FIG. 10b shows how the situations of FIG. 10a would look like after this step. In a second step, the smoothing is prepared by finding all suitable cuts 29 up to a pre-specified length. A cut 29 is suitable, if the length along the cut 29 between two boundary points is shorter than the length along the boundary between those points. FIG. 10c shows all such cuts 29 (up to a specific length) for a given boundary line 28. Finally, the user of the software is presented with a colored rendering of the 3D teeth meshes. Triangles that must be removed because of self-intersections are rendered in red, and triangles that are currently selected to be removed by smoothing are rendered in green. The user is able to control the amount of smoothing and therefore the extent of the green areas by specifying the maximum cut length. Additionally, the user might exclude specific regions from being cut away by clicking on them. A fully automated system can pre-select the cut length to a conservative value.

Finally, after the 3D-scans have been trimmed and smoothed, the necessary connecting mesh shells 14 (see FIG. 6) are generated to unite them with the printing base plate 24. The printing base plates 24 are the predefined parts of the final 3D-printed model that fit exactly into the mounting plates 18 (see FIG. 6).

FIGS. 11a-d show schematic representations of exemplary predefined distance blocks 17a for the upper jaw models (upper jaw distance blocks). Each figure respectively shows an upper jaw distance block 17a with a predefined height in a bottom view (left hand side of FIGS. 11a-d), a side view (in the middle of FIGS. 11a-d) and a top view (right hand side of FIGS. 11a-d). According to the example of FIG. 11, a first upper jaw distance block has a height of 25 mm, a second upper jaw distance block has a height of 35 mm, a third upper jaw distance block has a height of 45 mm and a fourth upper jaw distance block has a height of 55 mm. These four upper jaw distance blocks may form a corresponding set of upper jaw distance blocks.

FIGS. 12a-d show schematic representations of exemplary predefined distance blocks 17b for the lower jaw models (lower jaw distance blocks). Each figure respectively shows a lower jaw distance block 17b with a predefined height in a bottom view (left hand side of FIGS. 12a-d), a side view (in the middle of FIGS. 12a-d) and a top view (right hand side of FIGS. 12a-d). According to the example of FIG. 12, a first lower jaw distance block has a height of 15 mm, a second lower jaw distance block has a height of 25 mm, a third lower jaw distance block has a height of 35 mm and a fourth lower jaw distance block has a height of 45 mm. These four lower jaw distance blocks may form a corresponding set of lower jaw distance blocks.

In particular, four upper jaw distance blocks and four lower jaw distance blocks are provided so that a set of distance blocks comprises eight distance blocks. Of course, it is also possible that a set comprises any other number of distance blocks, for example five, six, seven, eight, etc. upper jaw distance blocks and five, six, seven, eight, etc. lower jaw distance blocks. A first surface of a distance block 17 comprises connection means for connecting the distance block 17 with a mounting plate 18 and/or with the dental model structure 100. A second surface of the distance block, which is substantially opposite to the first surface, comprises connection means for connecting the distance block 17 with the articulator, particularly with a base plate of the articulator. Furthermore, as can be seen in FIGS. 11a-d, 12a-d, as well as in FIGS. 7 and 8, the first surface of the distance block 17 is inclined with respect to the second surface. In other words, the distance block 17 has an oblique geometry or form. Preferably, an inclination angle of the first surface with respect to the second surface of the distance block 17 is based on or corresponds to a well-known average inclination angle of the bite area or occlusion plane. Each distance block 17 comprises a magnet 30 for connecting the distance block with a mounting plate (also comprising a magnetic element). The distance blocks have been developed particularly for use in connection with the present invention. However, they can generally also be used for mounting conventional dental models by using gypsum.

Figure 13A:
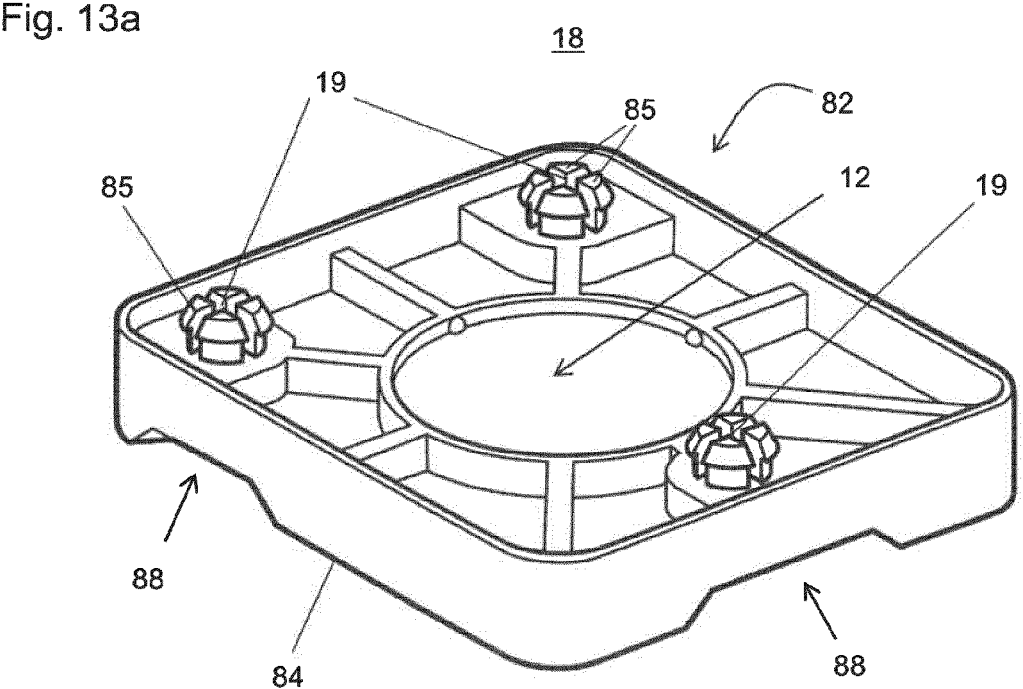
FIG. 13a shows a schematic representation of a mounting plate according to a preferred embodiment in a first perspective view.
Figure 13B:
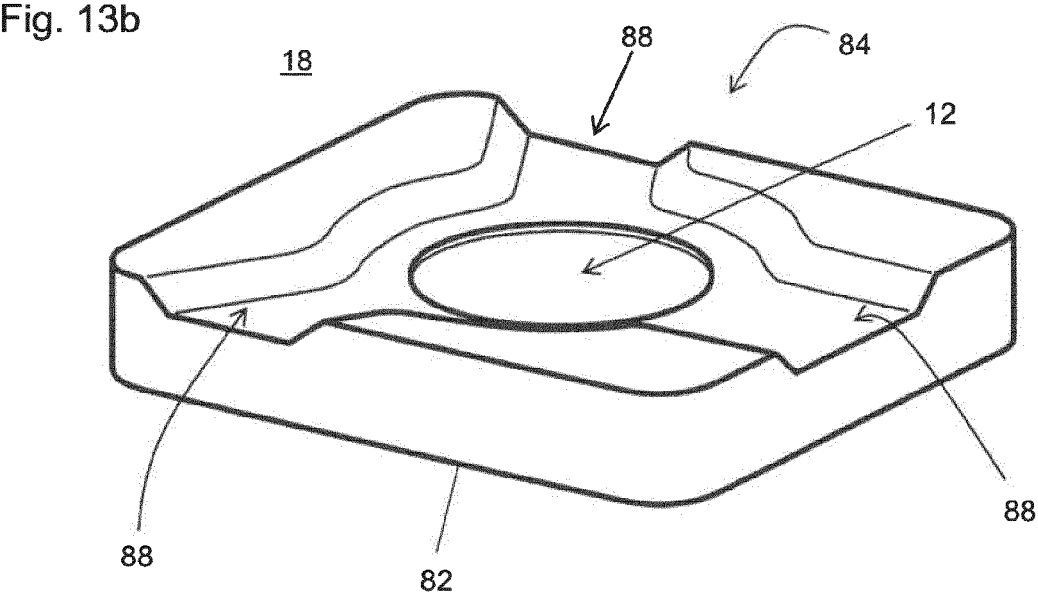
FIG. 13b shows a schematic representation of the mounting plate of FIG. 13a in a second perspective view.

FIGS. 13a and 13b show schematic representations of a mounting plate 18 in two different perspectives. In the perspective of FIG. 13a, a first surface 82 of the mounting plate 18 can be seen, while in the perspective of FIG. 13b, a second surface 84 (being on the opposite side of the first surface 82) of the mounting plate 18 can be seen. The mounting plate 18 is configured to connect a dental model structure 100 with a distance block 17. More specifically, the first surface 82 of the mounting plate 18 can be connected with or fixed to the dental model structure 100, while the second surface 84 of the mounting plate 18 can be connected with a distance block 17. The mounting plate 18 comprises three fixation means or snapping pins 19 for connecting the first surface 82 with complementary fixation means of the dental model structure 100. The mounting plate 18 further comprises a recess or a reception 12 for receiving a metal element or a magnet. And the mounting plate 18 further comprises three side recesses 88 each being formed on the second surface 84 of the mounting plate 18. The side recesses 88 serve for enabling a split cast control. The mounting plate 18 has a rectangular or quadratic shape, and the corners of the mounting plate 18 are rounded.

As can be seen from FIG. 13*a*, the fixation means or pins 19 of the mounting plate 18 are formed on the first surface 82. A first pin is arranged and/or formed at a first corner of the mounting plate 18. A second pin is arranged and/or formed at a second corner of the mounting plate 18. And a third pin is arranged and/or formed in the middle of a side that is located opposite to the first and second corners. A pin 19 comprises four snapping elements 85. The four snapping elements 85 of a pin 19 are arranged to form a mushroom head. The reception 12 has a circular shape.

As can be seen from FIG. 13*b*, three side recesses 88 are formed on the second surface 84 of the mounting plate 18, thereby serving for enabling a split cast control. A first side recess is arranged and/or formed at a first side of the mounting plate 18. A second side recess is arranged and/or formed at a second side of the mounting plate 18. And a third side recess is arranged and/or formed at a third side of the mounting plate 18. The first and second side recesses are formed near a corner of the mounting plate, while the third side recess is formed in the middle of the third side of the mounting plate. Thus, the side recesses 88 are arranged in a triangle. The side recesses are configured and arranged such that they are engageable with complementary structures, i.e. with protrusions 35, of a distance block (see FIG. 4*a*). In particular, the present invention relates to a model fixing system, which is named "AxioSnapMount" system by the applicant, for printed dental models. So far, mostly printed models have been articulated for transfer into the articulator with plaster. Alternatively, model mounting clamps or simple model fixators that actually do not deserve the name articulator were used. With the present invention, digital models can be reproducibly and anatomically correctly mounted in a proper articulator. In particular, the "AxioSnapMount" system comprises one or more of the following:

the different height spacers (distance elements or distance blocks), particularly with magnetic split cast;
the mounting plates for attachment to the printed model base; and
the "AxioComp" software that automatically "scribbles" the digital models.

Advantageously, this truly enables a digital workflow with cost-effective return to the analog world. With an intraoral scanner, the digital upper and lower jaw models, respectively their assignment (bite), can be created. With the "SAM AxioQuick transfer bow" and the "AxioPRISA", the anatomical upper jaw position can be recorded digitally. With the "AxioQuickRecorder", the movement of the lower jaw can be recorded. The digitally generated data can be brought together in the software "AxioComp". And in the end, corresponding dental model structures can be printed by a 3D-printer and simulated patient-correctly in an articulator.

The predefined distance elements or distance blocks serve as "adapter elements" in order to directly (without the need of further mounting elements and/or material) mount the printed dental model structure on the articulator. In this way, the size of the dental model structure to be printed can be reduced, since it is not necessary to print further mounting material or structures, which would be necessary for a direct mounting on the articulator without the use of predefined distance elements. The present invention thus results in a plaster-free model mounting of printed models. Further, digital models can be printed and directly used with a real articulator at any time and at any place in the world. This significantly reduces the storage space required for storing the dental models (since the dental model structures according to the present invention have smaller heights compared to assembled plaster models). Different distance block sizes reduce the model height to an optimum, which saves printing time and material.

LIST OF REFERENCE NUMERALS

1 head of a patient
2 face bow (transfer assembly)
3 bite fork
5 articulator
6*a* articulator upper base plate (upper mounting plate)
6*b* articulator lower base plate (lower mounting plate)
6*c* mounting means
7*a* upper jaw dental model
7*b* lower jaw dental model
8 virtual representation of a dental situation data set (teeth scan/3D-scan)
9 gypsum/dental stone
12 recess (split cast reception)
13 dental situation element
13*a* upper jaw situation element
13*b* lower jaw situation element
14 mesh structure (connecting meshes)
15 connecting structure or virtual connecting structure
15*a* upper jaw connecting structure
15*b* lower jaw connecting structure
17*a* upper jaw distance block (upper jaw mounting socket)
17*b* lower jaw distance block (lower jaw mounting socket)
18 mounting plate
18*a* upper jaw mounting plate
18*b* lower jaw mounting plate
19 fixation means (snapping pin)
19*a* upper jaw fixation means (upper jaw snapping pin)
20 distance element
20*a* upper jaw distance element
20*b* lower jaw distance element
22 platform
22*a* upper jaw platform
22*b* lower jaw platform
24 printing base plate
24*a* upper jaw printing base plate
24*b* lower jaw printing base plate
26 area with holes left after cutting
28 mesh boundary line
29 cut
30 magnet
35 protrusion
37*a* virtual representation of upper jaw distance block
38*a* virtual representation of upper mounting plate
40*a* virtual representation of upper jaw distance element
50 virtual articulator
60*a* virtual representation of articulator upper base plate (upper mounting plate)

60b virtual representation of articulator lower base plate (lower mounting plate)
60c virtual representation of mounting means
65 virtual representation of facebow (transfer assembly)
70a virtual representation of upper jaw dental model
70b virtual representation of lower jaw dental model
82 first surface of mounting plate
84 second surface of mounting plate
85 snapping element
88 side recess (side opening for split cast control)
100 dental model structure
100a upper jaw model structure
100b lower jaw model structure
C cutting plane
P bite area plane (occlusal plane)

The invention claimed is:

1. A method for providing a 3D-print data set of a dental model structure to be mounted on an articulator, comprising the steps of:
   providing an articulator data set of the articulator on which the dental model structure is to be mounted;
   providing a dental situation data set which represents a dental situation of an upper jaw and/or a lower jaw, the dental situation data set including data to display the dental situation as a virtual representation of the dental situation on a display;
   selecting a distance element from a plurality of different predefined and/or prefabricated distance elements based on the articulator data set and the dental situation data set, wherein the selected distance element comprises a distance block and a mounting plate, wherein the mounting plate is configured to connect the dental model structure with the distance block, and wherein the mounting plate comprises:
      fixation means for connecting a first surface of the mounting plate with complementary fixation means of the dental model structure,
      a reception for receiving a metal element, and
      at least one side recess being formed on a second surface of the mounting plate for enabling a split cast control;
   generating a connecting structure data set representing at least one virtual connecting structure arranged between the virtual representation of the dental situation and a virtual representation of the selected distance element, wherein the at least one virtual connecting structure is adapted to connect the virtual representation of the dental situation with a virtual representation of the mounting plate; and
   generating the 3D-print data set based on the dental situation data set and the connecting structure data set.

2. The method according to claim 1, wherein the at least one virtual connecting structure connects the virtual representation of the dental situation with the virtual representation of the mounting plate via fixation means.

3. The method according to claim 1, wherein the step of providing the dental situation data set comprises measuring the dental situation, particularly by means of an intraoral scanner.

4. The method according to claim 1, wherein the step of generating the connecting structure data set comprises:
   trimming the virtual representation of the dental situation to an essential part, wherein the essential part is preferably defined by a bite area plane and at least one cutting plane of the virtual representation of the dental situation, wherein the at least one cutting plane is parallel to the bite area plane and shifted with respect to the bite area plane by a predefined distance.

5. The method according to claim 4, wherein the bite area plane is defined by a user input and/or by means of solving a non-linear least squares optimization problem based on an initial estimation.

6. The method according to claim 1, wherein the step of generating the connecting structure data set comprises one or more of the following:
   defining a bite area plane;
   defining at least one cutting plane;
   checking, whether a smoothing of one or more teeth scan boundaries is necessary, and if so, performing said smoothing;
   generating a mesh structure;
   generating a printing base plate, wherein the mesh structure is particularly merged with the printing base plate.

7. The method according to claim 1, wherein the at least one virtual connecting structure comprises a platform and a printing base plate, wherein a plurality of connecting meshes are created to be arranged between the platform and the printing base plate to connect a lower boundary line of the platform with an upper boundary line of the printing base plate.

8. The method according to claim 7, wherein the at least one virtual connecting structure is arranged such that an upper boundary line of the platform coincides with a mesh boundary line of the virtual representation of the dental situation.

9. The method according to claim 7, wherein the printing base plate comprises fixing means for fixing the printing base plate on the mounting plate of the selected distance element, wherein the mounting plate is prefabricated.

10. The method according to claim 1, further comprising printing the dental model structure by means of a 3D-printer based on the 3D-print data set.

11. A computer program product comprising computer-readable instructions, which, when loaded into a memory of a computer and executed by the computer, cause the computer to perform a method according to claim 1.

12. A dental model structure, comprising at least one dental situation element representing a dental situation of an upper jaw and/or a lower jaw; and
   at least one connecting structure supporting the at least one dental situation element;
   wherein the at least one dental situation element and the at least one connecting structure being fabricated by means of a 3D-printer and based on a 3D-print data set provided by the method according to claim 1.

13. The dental model structure according to claim 12, wherein the at least one connecting structure comprises fixing means to be connected with complementary fixing means of the distance element.

14. The dental model structure according to claim 12, wherein the at least one connecting structure comprises a printing base plate having connecting means for connecting the dental model structure with the mounting plate of the distance element.

15. The dental model structure according to claim 12, wherein the at least one connecting structure comprises a printing base plate having fixing means for fixing the printing base plate on the prefabricated mounting plate which serves for connecting the dental model structure with the distance block.

16. A dental model system, comprising:
   the dental model structure according to claim 13; and
   the preselected and prefabricated distance element.

17. A method for providing a 3D-print data set of a dental model structure to be mounted on an articulator, comprising the steps of:
- providing an articulator data set of the articulator on which the dental model structure is to be mounted;
- providing a dental situation data set which represents a dental situation of an upper jaw and/or a lower jaw, the dental situation data set including data to display the dental situation as a virtual representation of the dental situation on a display;
- selecting at least one distance element from a plurality of different predefined and/or prefabricated distance elements based on the articulator data set and the dental situation data set;
- generating a connecting structure data set representing at least a virtual connecting structure arranged between the virtual representation of the dental situation and a virtual representation of the at least one selected distance element; and
- generating the 3D-print data set based on the dental situation data set and the connecting structure data set;
- wherein the step of generating the connecting structure data set comprises one or more of the following:
- defining a bite area plane;
- defining at least one cutting plane;
- checking, whether a smoothing of one or more teeth scan boundaries is necessary, and if so, performing said smoothing;
- generating a mesh structure;
- generating a printing base plate.

18. The method according to claim 17, wherein the step of generating the connecting structure data set comprises generating the mesh structure and generating the printing base plate, wherein the mesh structure is merged with the printing base plate.

19. A computer program product comprising computer-readable instructions, which, when loaded into a memory of a computer and executed by the computer, cause the computer to perform a method according to claim 17.

20. A dental model structure, comprising
- at least one dental situation element representing a dental situation of an upper jaw and/or a lower jaw; and
- at least one connecting structure supporting the at least one dental situation element;
- wherein the at least one dental situation element and the at least one connecting structure being fabricated by means of a 3D-printer and based on a 3D-print data set provided by the method according to claim 17.

21. A method for providing a 3D-print data set of a dental model structure to be mounted on an articulator, comprising the steps of:
- providing an articulator data set of the articulator on which the dental model structure is to be mounted;
- providing a dental situation data set which represents a dental situation of an upper jaw and/or a lower jaw, the dental situation data set including data to display the dental situation as a virtual representation of the dental situation on a display;
- selecting at least one distance element from a plurality of different predefined and/or prefabricated distance elements based on the articulator data set and the dental situation data set;
- generating a connecting structure data set representing at least a virtual connecting structure arranged between the virtual representation of the dental situation and a virtual representation of the at least one selected distance element; and
- generating the 3D-print data set based on the dental situation data set and the connecting structure data set;
- wherein the at least one virtual connecting structure comprises a platform and a printing base plate, wherein a plurality of connecting meshes are created to be arranged between the platform and the printing base plate to connect a lower boundary line of the platform with an upper boundary line of the printing base plate.

22. The method according to claim 21, wherein the at least one virtual connecting structure is arranged such that an upper boundary line of the platform coincides with a mesh boundary line of the virtual representation of the dental situation.

23. The method according to claim 21, wherein the printing base plate comprises fixing means for fixing the printing base plate on a prefabricated mounting plate of the at least one selected distance element.

24. A computer program product comprising computer-readable instructions, which, when loaded into a memory of a computer and executed by the computer, cause the computer to perform a method according to claim 21.

25. A dental model structure, comprising
- at least one dental situation element representing a dental situation of an upper jaw and/or a lower jaw; and
- at least one connecting structure supporting the at least one dental situation element;
- wherein the at least one dental situation element and the at least one connecting structure being fabricated by means of a 3D-printer and based on a 3D-print data set provided by the method according to claim 21.

* * * * *